(12) United States Patent
Murakami et al.

(10) Patent No.: US 10,328,764 B2
(45) Date of Patent: Jun. 25, 2019

(54) VEHICLE HEIGHT ADJUSTMENT APPARATUS

(71) Applicant: Showa Corporation, Gyoda-shi (JP)

(72) Inventors: Yosuke Murakami, Fukuroi (JP); Hiroyuki Miyata, Fukuroi (JP); Fumiaki Ishikawa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 266 days.

(21) Appl. No.: 15/466,428

(22) Filed: Mar. 22, 2017

(65) Prior Publication Data

US 2017/0282996 A1 Oct. 5, 2017

(30) Foreign Application Priority Data

Mar. 31, 2016 (JP) ................................ 2016-071271

(51) Int. Cl.
*F16F 9/56* (2006.01)
*B60G 17/056* (2006.01)
(Continued)

(52) U.S. Cl.
CPC ......... *B60G 17/0565* (2013.01); *B60G 13/14* (2013.01); *B60G 17/016* (2013.01);
(Continued)

(58) Field of Classification Search
CPC ...... B62K 25/08; B62K 25/283; B62K 25/04; B62K 2025/044; B62K 2025/045;
(Continued)

(56) References Cited

U.S. PATENT DOCUMENTS 5,101,923 A * 4/1992 Odagi .................. B60G 17/033
                                                                     180/219
5,201,384 A * 4/1993 Kiyota ................. B60G 17/033
                                                                     180/219
(Continued)

FOREIGN PATENT DOCUMENTS

EP          2902222 A       8/2015
EP          2913209 A       9/2015
(Continued)

OTHER PUBLICATIONS

Extended European Search Report dated Aug. 24, 2017 for the corresponding European Patent Application No. 17162521.3.

*Primary Examiner* — Peter D Nolan
(74) *Attorney, Agent, or Firm* — Leason Ellis LLP

(57) ABSTRACT

A vehicle height adjustment apparatus includes a control device. The control device controls the opening degree of the solenoid valve to allow a movement amount of the support member to reach a movement amount target value that corresponds to the vehicle height set in advance, in accordance with the weight applied to the vehicle. The control device controls the opening degree of the solenoid valve to change the movement amount of the support member based on a difference between a value based on the information related to the vehicle height and a vehicle height-related target value, on condition that the movement amount of the support member reaches the movement amount target value and the value based on the information related to the vehicle height obtained by the information obtaining device does not reach the vehicle height-related target value that corresponds to the vehicle height set in advance.

8 Claims, 21 Drawing Sheets

(51) Int. Cl.

| | | |
|---|---|---|
| *B62K 25/04* | (2006.01) | |
| *B62K 25/08* | (2006.01) | |
| *B62K 25/28* | (2006.01) | |
| *B60G 13/14* | (2006.01) | |
| *B60G 17/016* | (2006.01) | |
| *B60G 17/018* | (2006.01) | |
| *B60G 17/019* | (2006.01) | |
| *B60G 17/027* | (2006.01) | |
| *B60G 17/044* | (2006.01) | |

(52) U.S. Cl.
CPC ......... *B60G 17/018* (2013.01); *B60G 17/019* (2013.01); *B60G 17/0161* (2013.01); *B60G 17/0272* (2013.01); *B60G 17/044* (2013.01); *B62K 25/04* (2013.01); *B62K 25/08* (2013.01); *B62K 25/283* (2013.01); *F16F 9/56* (2013.01); *B60G 2204/62* (2013.01); *B60G 2300/12* (2013.01); *B60G 2400/204* (2013.01); *B60G 2400/25* (2013.01); *B60G 2400/252* (2013.01); *B60G 2400/60* (2013.01); *B60G 2500/30* (2013.01); *B60G 2600/02* (2013.01); *B60G 2600/09* (2013.01); *B60G 2600/181* (2013.01); *B60G 2600/1877* (2013.01); *B60G 2600/20* (2013.01); *B60G 2800/914* (2013.01); *B62K 2025/044* (2013.01); *B62K 2025/045* (2013.01); *F16F 2230/08* (2013.01)

(58) Field of Classification Search
CPC .......... B60G 2400/204; B60G 17/0565; B60G 17/016; B60G 17/044; B60G 17/0272; B60G 17/019; B60G 17/018; B60G 17/0161; B60G 13/14; B60G 2204/62; B60G 2300/12; B60G 2800/914; B60G 2600/20; B60G 2600/1877; B60G 2600/181; B60G 2600/09; B60G 2600/02; B60G 2500/30; B60G 2400/60; B60G 2400/252; B60G 2400/25; F16F 2230/08; F16F 9/56

See application file for complete search history.

(56) References Cited

U.S. PATENT DOCUMENTS

| | | | |
|---|---|---|---|
| 8,672,334 B1* | 3/2014 | Murakami | B60G 17/015 280/5.514 |
| 8,844,944 B1* | 9/2014 | Murakami | B60G 17/016 280/5.514 |
| 9,004,500 B2* | 4/2015 | Murakami | B62K 25/08 280/5.514 |
| 9,016,700 B2* | 4/2015 | Murakami | B60G 17/015 180/227 |
| 9,114,846 B1* | 8/2015 | Ishikawa | B60G 17/0272 |
| 9,132,712 B2* | 9/2015 | Kasuga | B60G 17/015 |
| 9,180,746 B2* | 11/2015 | Kasuga | B60G 17/0272 |
| 9,708,028 B1* | 7/2017 | Arnott | B62K 25/28 |
| 2006/0124371 A1* | 6/2006 | Montgomery | B62K 25/04 180/219 |
| 2006/0196741 A1* | 9/2006 | Kindblom | B60G 15/061 188/318 |
| 2014/0077464 A1* | 3/2014 | Murakami | B62K 25/10 280/5.514 |
| 2014/0077465 A1* | 3/2014 | Murakami | B62K 25/06 280/6.157 |
| 2014/0077466 A1* | 3/2014 | Murakami | B62K 25/04 280/6.157 |
| 2014/0083093 A1* | 3/2014 | Murakami | F15B 15/20 60/459 |
| 2014/0084528 A1* | 3/2014 | Murakami | B60G 17/0272 267/221 |
| 2014/0084555 A1* | 3/2014 | Murakami | B60G 13/08 280/5.514 |
| 2014/0167371 A1* | 6/2014 | Murakami | B62K 25/08 280/5.514 |
| 2014/0175764 A1* | 6/2014 | Murakami | B60G 17/015 280/5.514 |
| 2014/0291943 A1* | 10/2014 | Murakami | B60G 17/016 280/5.514 |
| 2015/0239526 A1* | 8/2015 | Ishikawa | B60G 17/0272 280/6.152 |
| 2018/0229807 A1* | 8/2018 | Furia | B62M 25/06 |

FOREIGN PATENT DOCUMENTS

| | | |
|---|---|---|
| JP | 61-235285 A | 10/1986 |
| JP | 08-22680 B | 3/1996 |

\* cited by examiner

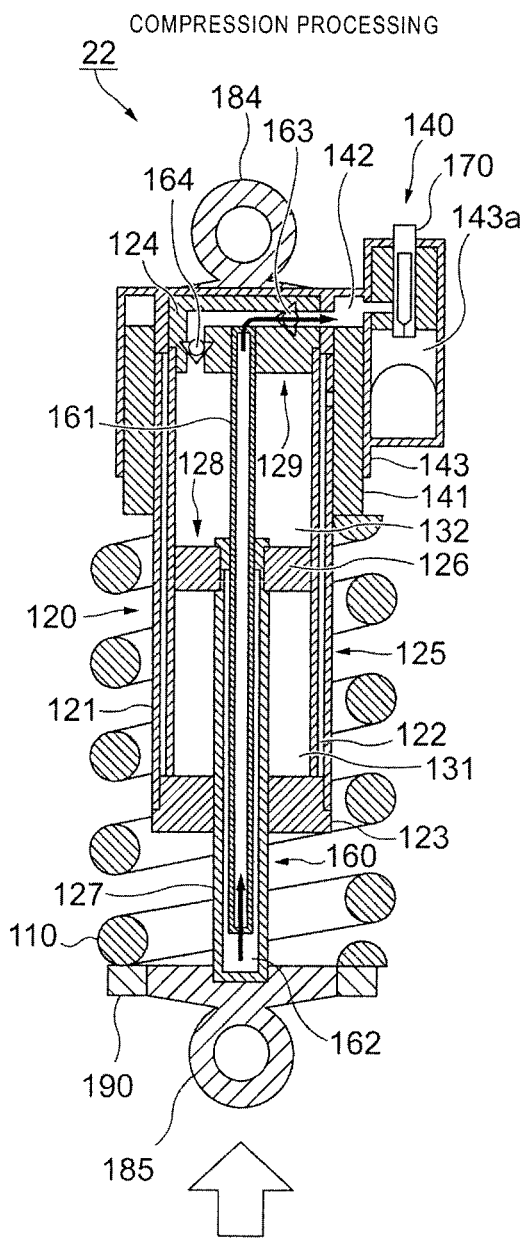
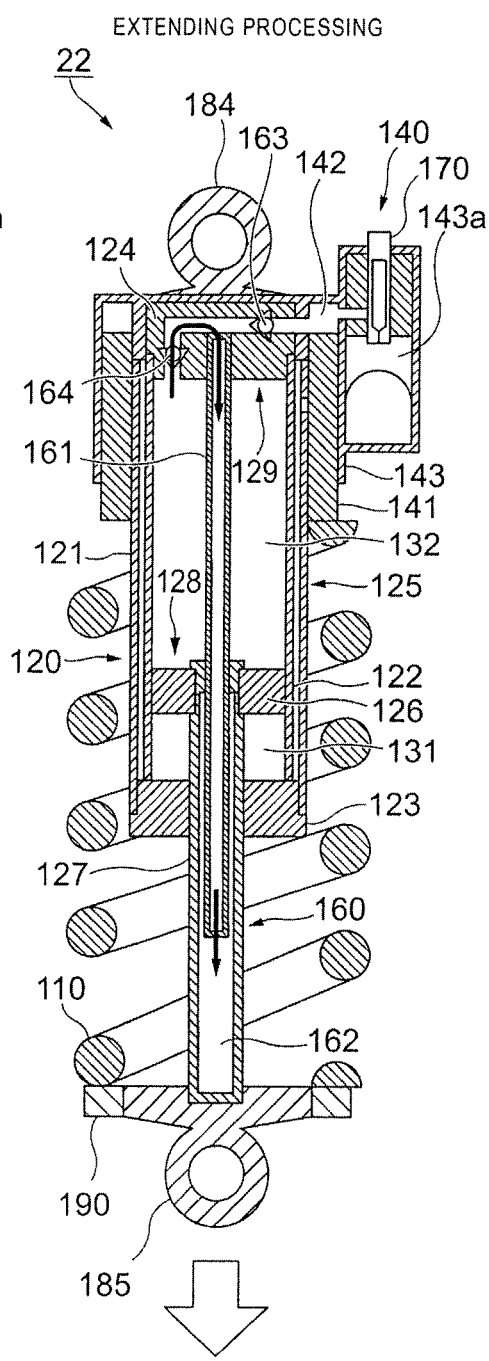
FIG. 3A — COMPRESSION PROCESSING
FIG. 3B — EXTENDING PROCESSING FIG. 8A COMPRESSION PROCESSING
FIG. 8B EXTENDING PROCESSING
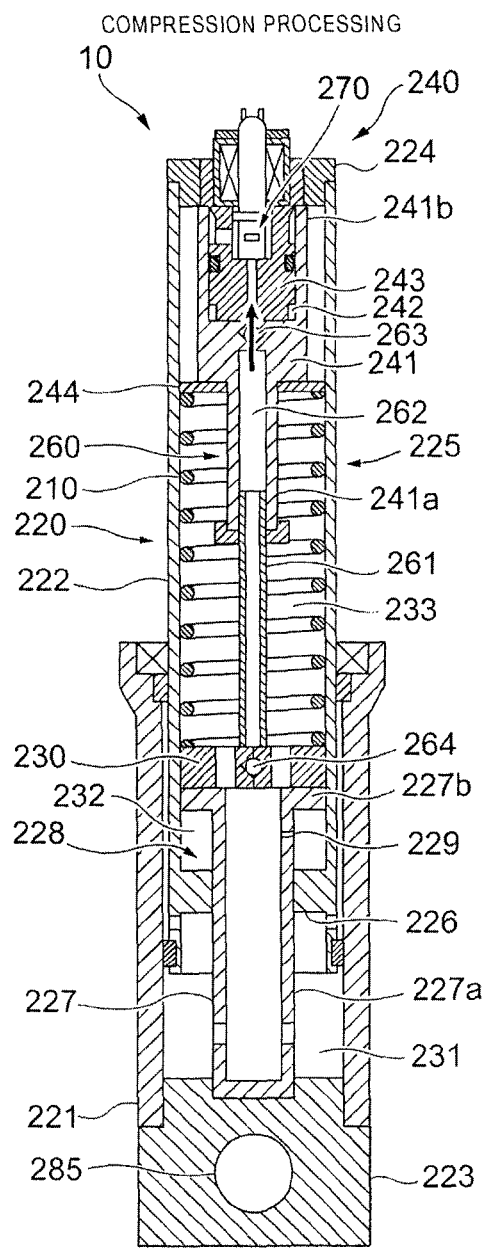
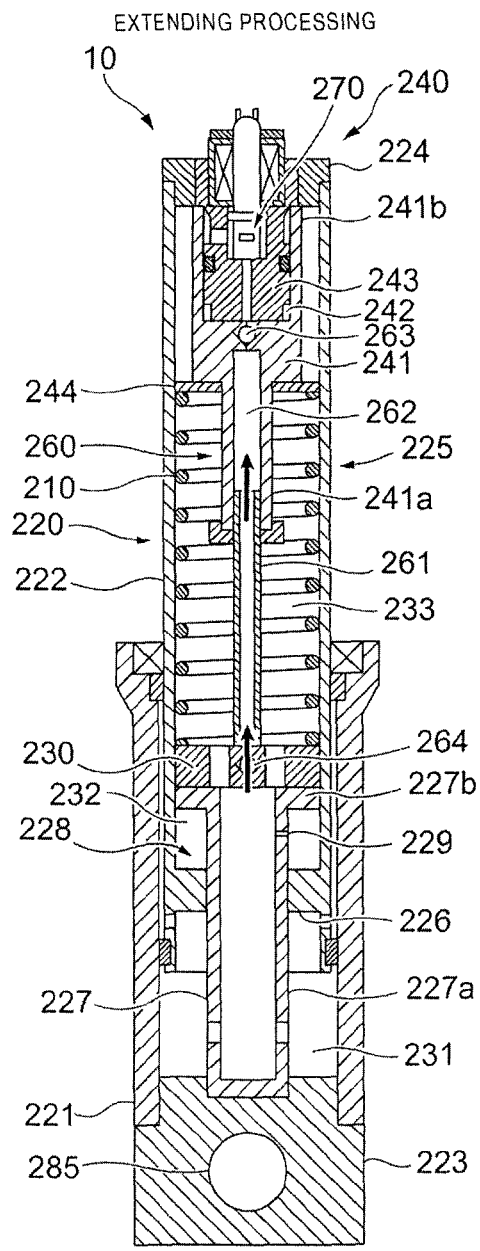

FIG. 9A
FIG. 9B
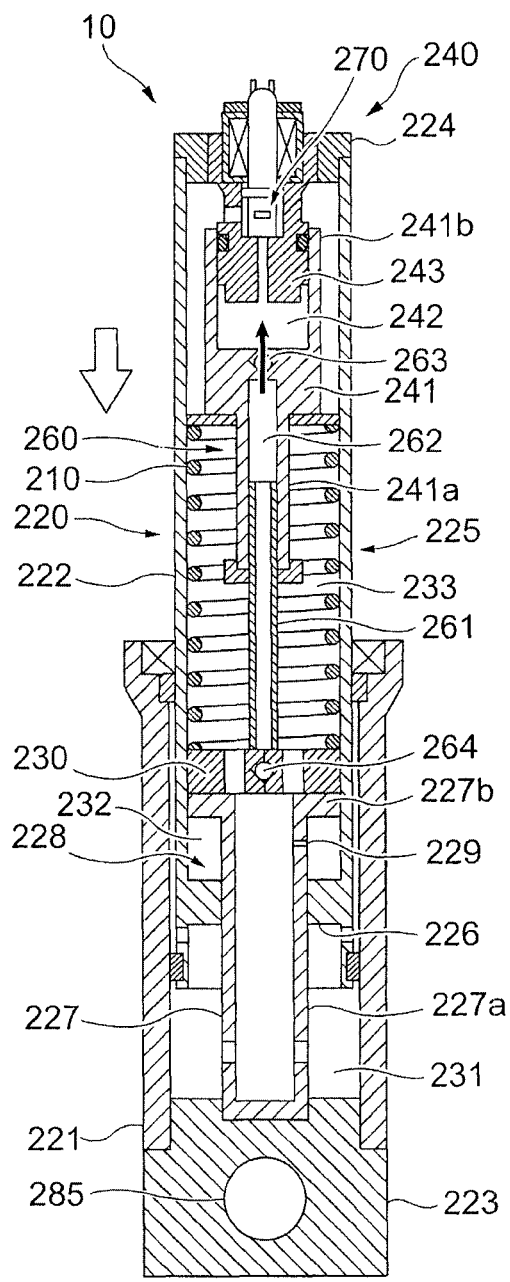
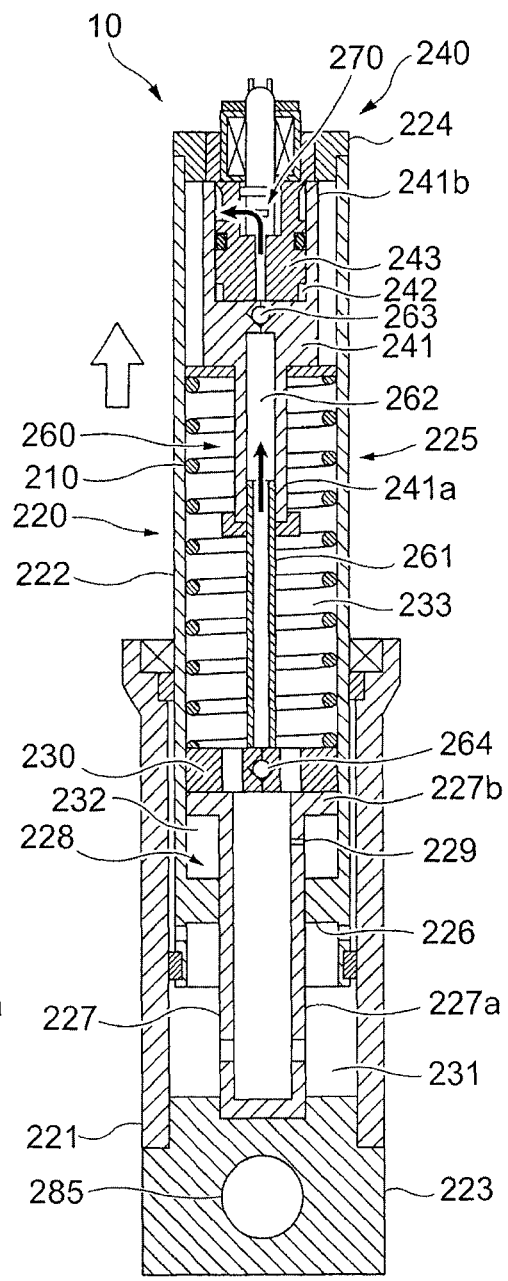

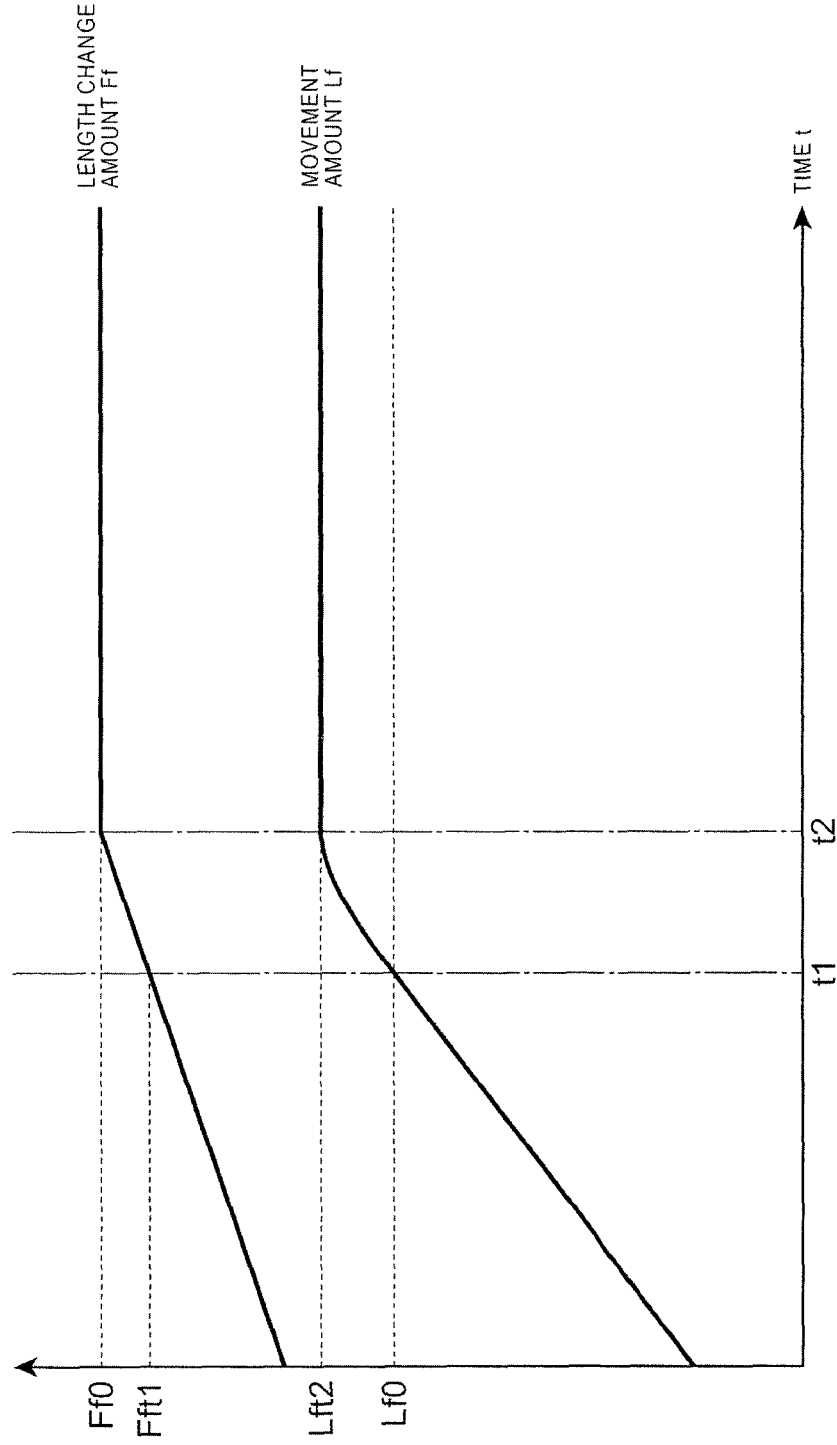

VEHICLE HEIGHT ADJUSTMENT APPARATUS

CROSS-REFERENCE TO RELATED APPLICATION

This application claims priority from Japanese Patent Application No. 2016-071271 filed on Mar. 31, 2016, the entire contents of which are incorporated herein by reference.

BACKGROUND

Field

The present invention relates to a vehicle height adjustment apparatus which adjusts the vehicle height of a motorcycle.

Related Art

In recent years, there is proposed an apparatus that increases the vehicle height of a motorcycle while traveling and decreases the vehicle height in order for a driver to easily get on and off the motorcycle at a stop.

In addition, for example, a vehicle height adjustment apparatus described in JP-B-H08-22680 is configured as follows. In other words, a rear wheel is supported via an axle at a rear end of a rear arm which is pivotally supported in a rear portion of a vehicle body frame of a motorcycle. A hydraulic shock absorbing device is disposed via a link mechanism between the rear arm and the vehicle body frame. The hydraulic shock absorbing device includes a hydraulic damper and a shock absorbing spring. A lid body is fitted to a head portion opening of a cylinder, and the lid body also serves as a mounting bracket of the cylinder. A support tube is fixed to the lid body in a state of being loosely fitted to the periphery of the cylinder. In addition, a tube-like spring seat is slidably fitted and inserted to the cylinder and the support tube. The spring seat supports a shock absorbing spring on a side opposite to a bracket of a piston rod. A working oil chamber is formed on an inner side of the support tube and changes a hydraulic pressure in the working oil chamber, and according to this, an interval between the rear arm and the frame is enlarged by pushing down the spring seat against the shock absorbing spring and by elongating a hydraulic damper, and the vehicle height is increased.

SUMMARY

In an apparatus which adjusts the vehicle height by changing an initial length of a spring and by changing an initial load, the vehicle height changes due to a weight applied to a vehicle, such as a weight of a body of a person who gets on the vehicle or a weight of baggage. For example, the vehicle height becomes lower than a desirable height in a case where the weight applied to the vehicle is greater than an estimated weight, and the vehicle height becomes higher than a desirable height in a case where the weight applied to the vehicle is less than an estimated weight. In particular, it is desirable that the vehicle height when traveling is a desirable height regardless of the weight applied to the vehicle since the vehicle height influences a ride quality or traveling stability.

The invention provides a vehicle height adjustment apparatus which can adjust the vehicle height to a desirable height regardless of the weight applied to the vehicle.

According to an aspect of the invention, a vehicle height adjustment apparatus includes a spring, a damper, a support member, a working oil chamber, a solenoid vale, an information obtaining device, and a control device. The spring connects a vehicle main body of a vehicle and a wheel to each other and expands and contracts in accordance with a weight applied to the vehicle. The damper damps vibration of the spring by movement of working oil that follows an expansion and contraction operation. The support member supports one end portion of the spring and moves with respect to the damper to thereby change a length of the spring. The working oil, which moves the support member with respect to the damper, flows into the working oil chamber in accordance with the expansion and contraction operation of the damper. The solenoid valve adjusts an amount of working oil that flows into the working oil chamber by an opening degree thereof. The information obtaining device obtains information related to a vehicle height. The control device controls the opening degree of the solenoid valve to allow a movement amount of the support member to reach a movement amount target value that corresponds to the vehicle height set in advance, in accordance with the weight applied to the vehicle. The control device controls the opening degree of the solenoid valve to change the movement amount of the support member based on a difference between (i) a value based on the information related to the vehicle height and (ii) a vehicle height-related target value, on condition that the movement amount of the support member reaches the movement amount target value and the value based on the information related to the vehicle height obtained by the information obtaining device does not reach the vehicle height-related target value that corresponds to the vehicle height set in advance.

According to the invention, it is possible to provide a vehicle height adjustment apparatus which can adjust the vehicle height to a desirable height regardless of the weight applied to the vehicle.

BRIEF DESCRIPTION OF THE DRAWINGS

FIGS. 3A and 3B are views describing an operation of a rear wheel side liquid supply device.

FIGS. 8A and 8B are views describing an operation of a front wheel side liquid supply device.

FIGS. 9A and 9B are views describing vehicle height adjustment performed by a front wheel side relative position changing device.

FIG. 18 is a view illustrating a change in a movement amount on a front wheel side and a change in a length change amount on the front wheel side following traveling of the motorcycle in a case where the vehicle height does not reach a target height even when the movement amount of a support member reaches a target movement amount.

DESCRIPTION OF EMBODIMENTS

Hereinafter, embodiments of the invention will be described in detail with reference to the attached drawings.

Figure 1:
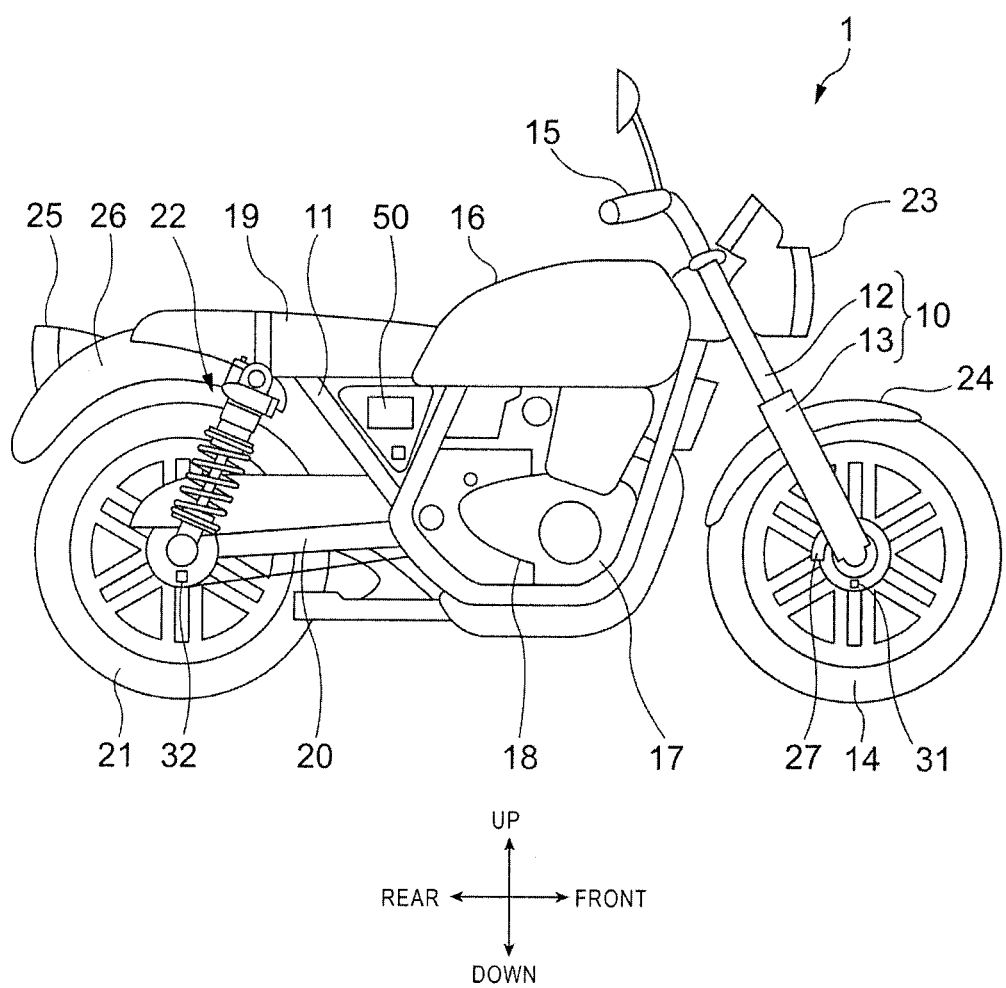
FIG. 1 is a view illustrating a schematic configuration of a motorcycle according to an embodiment.

FIG. 1 is a view illustrating a schematic configuration of a motorcycle 1 according to the embodiment.

As illustrated in FIG. 1, the motorcycle 1 includes two front forks 10 which are an example of a front wheel side suspension apparatus, a vehicle body frame 11, and a front wheel 14 which is mounted on lower ends of the two front forks 10. The two front forks 10 are respectively disposed one by one on a left side and on a right side of the front wheel 14. In FIG. 1, only the front fork 10 disposed on the right side is illustrated. The front fork 10 includes a fork pipe 12 mounted on the vehicle body frame 11, and a bottom case 13 on which the front wheel 14 is mounted.

In addition, the motorcycle 1 includes a handle bar 15 which is mounted on an upper portion of the front fork 10, a fuel tank 16 which is mounted on a front upper portion of the vehicle body frame 11, and an engine 17 and a transmission 18 which are disposed below the fuel tank 16.

In addition, the motorcycle 1 includes a seat 19 which is mounted on a rear upper portion of the vehicle body frame 11, a swing arm 20 which is swingably mounted on a lower portion of the vehicle body frame 11, a rear wheel 21 which is mounted on a rear end of the swing arm 20, and one or two rear suspensions 22 which are an example of a rear wheel side suspension apparatus mounted on a space between a rear portion (rear wheel 21) of the swing arm 20 and a rear portion of the vehicle body frame 11.

In addition, the motorcycle 1 includes a head lamp 23 which is disposed in front of the fork pipe 12, a front fender 24 which is mounted on the front fork 10 to cover an upper portion of the front wheel 14, a rear lamp 25 which is disposed behind the seat 19, and a rear fender 26 which is mounted to cover an upper portion of the rear wheel 21 below the rear lamp 25. In addition, the motorcycle 1 includes a brake 27 which stops the rotation of the front wheel 14.

In addition, the motorcycle 1 includes a front wheel rotation detection sensor 31 which detects a rotation angle of the front wheel 14, and a rear wheel rotation detection sensor 32 which detects the rotation angle of the rear wheel 21.

In addition, the motorcycle 1 includes a control device 50 which controls opening degrees of a front wheel side solenoid valve 270 (which will be described later) of the front fork 10 and a rear wheel side solenoid valve 170 (which will be described later) of the rear suspension 22. The control device 50 controls a vehicle height of the motorcycle 1 by controlling the opening degrees of the front wheel side solenoid valve 270 and the rear wheel side solenoid valve 170 which will be described later. An output signal from the above-described front wheel rotation detection sensor 31 or the rear wheel rotation detection sensor 32 is input to the control device 50.

In addition, in the motorcycle 1, in the rear suspension 22, a rear wheel side relative position changing device 140, a rear wheel side liquid supply device 160, and a rear wheel side length change amount detector 341 (which will be described later) are included, and a vehicle height adjustment apparatus which is controlled by the control device 50 is provided. Similarly, in the front fork 10, a front wheel side relative position changing device 240, a front wheel side liquid supply device 260, and a front wheel side length change amount detector 342 (which will be described later) are included, and a vehicle height adjustment apparatus which is controlled by the control device 50 is provided.

Next, the rear suspension 22 will be described in detail.

Figure 2:
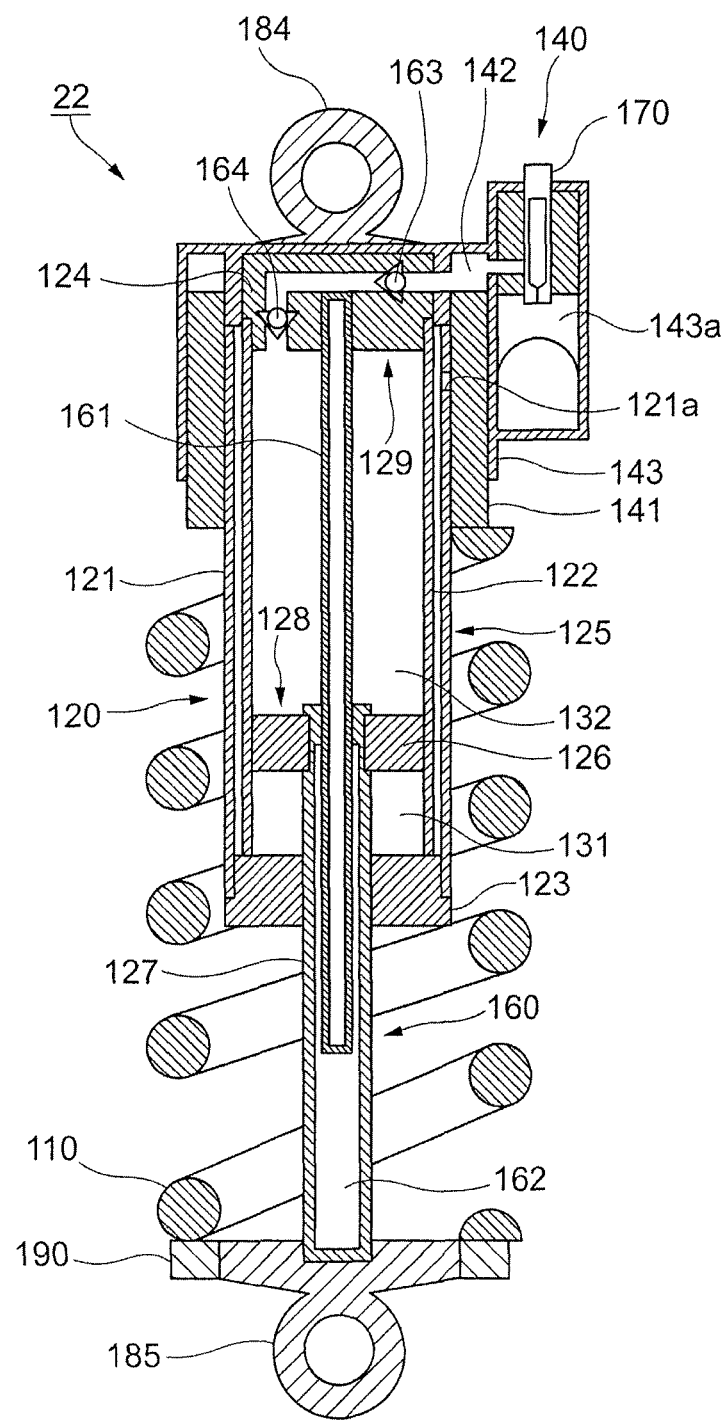
FIG. 2 is a sectional view of a rear suspension.

FIG. 2 is a sectional view of the rear suspension 22.

The rear suspension 22 is mounted on a space between the vehicle body frame 11 that is an example of a vehicle main body of the motorcycle 1 and the rear wheel 21. In addition, the rear suspension 22 includes a rear wheel side suspension spring 110 which is an example of a spring that supports a vehicle weight of the motorcycle 1 and absorbs shocks, and a rear wheel side damper 120 which is an example of a damper that damps vibration of the rear wheel side suspension spring 110. In addition, the rear suspension 22 includes the rear wheel side relative position changing device 140 and the rear wheel side liquid supply device 160. The rear wheel side relative position changing device 140 can change a rear wheel side relative position that is a relative position between the vehicle body frame 11 and the rear wheel 21 by adjusting a spring force of the rear wheel side suspension spring 110. The rear wheel side liquid supply device 160 supplies liquid to the rear wheel side relative position changing device 140. In addition, the rear suspension 22 includes a vehicle body side mounting member 184, an axle side mounting member 185, and a spring bearing 190. The vehicle body side mounting member 184 is used to mount the rear suspension 22 on the vehicle body frame 11. The axle side mounting member 185 is used to mount the rear suspension 22 on the rear wheel 21. The spring bearing 190 is mounted on the axle side mounting member 185 and supports one end portion (lower portion in FIG. 2), in a center line direction, of the rear wheel side suspension spring 110. The rear suspension 22 functions as an example of changing means and rear wheel side changing means for being capable of changing the relative position between the vehicle body frame 11 and the rear wheel 21 which is an example of a wheel.

As illustrated in FIG. 2, the rear wheel side damper 120 includes a cylinder 125. The cylinder 125 includes a thin cylindrical outer cylinder 121, a thin cylindrical inner cylinder 122, a bottom lid 123, and an upper lid 124. The inner cylinder 122 is accommodated in the outer cylinder 121. The bottom lid 123 blocks one end portion (lower portion in FIG. 2), in the center line direction (upward-and-downward direction in FIG. 2), of the outer cylinder 121 having a cylindrical shape. The upper lid 124 blocks the other end portion (upper portion in FIG. 2), in the center line direction, of the inner cylinder 122. Hereinafter, the center line direction of the cylinder of the outer cylinder 121 will be simply referred to as a "center line direction".

In addition, the rear wheel side damper 120 includes a piston 126 and a piston rod 127. The piston 126 is inserted into the inner cylinder 122 to be movable in the center line direction. The piston rod 127 extends in the center line direction and supports the piston 126 at the other end portion thereof (upper end portion in FIG. 2) in the center line direction. The piston 126 comes into contact with an inner circumferential surface of the inner cylinder 122, and divides a space in which liquid (oil in the embodiment) in the cylinder 125 is sealed into (i) a first oil chamber 131 which is on one end portion side, in the center line direction, of the piston 126 and (ii) a second oil chamber 132 which is on the other end portion side, in the center line direction, of the piston 126. The piston rod 127 is a cylindrical member, and a pipe 161 (which will be described later) is inserted thereinto. In addition, in the embodiment, the oil functions as an example of working oil.

In addition, the rear wheel side damper 120 includes a first damping force generating apparatus 128 and a second damping force generating apparatus 129. The first damping force generating apparatus 128 is disposed on the other end portion side, in the center line direction, of the piston rod 127. The second damping force generating apparatus 129 is disposed on the other end portion side, in the center line direction, of the inner cylinder 122. The first damping force generating apparatus 128 and the second damping force generating apparatus 129 damp expanding and contracting vibration between the cylinder 125 and the piston rod 127 following absorption of impact from a road surface by the rear wheel side suspension spring 110. The first damping force generating apparatus 128 is disposed to function as a connection path between the first oil chamber 131 and the second oil chamber 132, and the second damping force generating apparatus 129 is disposed to function as a connection path between the second oil chamber 132 and a jack chamber 142 (which will be described later) of the rear wheel side relative position changing device 140.

The rear wheel side liquid supply device 160 is a device which supplies the liquid into the jack chamber 142 (which will be described later) of the rear wheel side relative position changing device 140 by performing a pumping operation caused by the expanding and contracting vibration of the piston rod 127 with respect to the cylinder 125.

The rear wheel side liquid supply device 160 includes the cylindrical pipe 161 which is fixed to extend in the center line direction to the upper lid 124 of the rear wheel side damper 120. The pipe 161 is coaxially inserted into a pump chamber 162 which is the inside of the cylindrical piston rod 127.

In addition, the rear wheel side liquid supply device 160 includes a discharge check valve 163 which discharges the liquid in the pump chamber 162 pressurized by the movement of the piston rod 127 in the direction of entering the cylinder 125 and the pipe 161 to the jack chamber 142 side (which will be described later), and a suction check valve 164 which suctions the liquid in the cylinder 125 to the pump chamber 162 of which a pressure becomes negative by the movement of the piston rod 127 in the direction of retreating from the cylinder 125 and the pipe 161.

FIGS. 3A and 3B are views describing the operation of the rear wheel side liquid supply device 160.

In the rear wheel side liquid supply device 160 configured as described above, when the motorcycle 1 travels and a force is applied to the rear suspension 22 by roughness of the road surface, the piston rod 127 performs a pumping operation by the expanding and contracting vibration which advances and retreats to the cylinder 125 and the pipe 161. When the pump chamber 162 is pressurized by the pumping operation, the liquid in the pump chamber 162 opens the discharge check valve 163 and is discharged to the jack chamber 142 side of the rear wheel side relative position changing device 140 (refer to FIG. 3A), and when the pressure in the pump chamber 162 becomes negative, the liquid in the second oil chamber 132 of the cylinder 125 opens the suction check valve 164 and is suctioned to the pump chamber 162 (refer to FIG. 3B).

The rear wheel side relative position changing device 140 includes a support member 141 which is disposed to cover an outer circumference of the cylinder 125 of the rear wheel side damper 120 and supports the other end portion (upper portion in FIG. 3) in the center line direction in the rear wheel side suspension spring 110, and a hydraulic jack 143 which is disposed to cover the outer circumference on the other end portion side (upper side in FIG. 3) in the center line direction in the cylinder 125 and forms the support member 141 and the jack chamber 142. By filling the inside of the cylinder 125 with the liquid in the jack chamber 142 which is an example of a working oil chamber and by discharging the liquid from the inside of the jack chamber 142, the support member 141 moves in the center line direction with respect to the hydraulic jack 143. In addition, in the hydraulic jack 143, the vehicle body side mounting member 184 is mounted on an upper portion thereof, and as the support member 141 moves in the center line direction with respect to the hydraulic jack 143, a spring force of the rear wheel side suspension spring 110 changes, and as a result, a relative position of the seat 19 with respect to the rear wheel 21 changes.

In addition, the rear wheel side relative position changing device 140 includes the rear wheel side solenoid valve 170 which is a solenoid valve (solenoid valve) that is provided on a circulation path of the fluid between the jack chamber 142 and a liquid reservoir chamber 143a formed in the hydraulic jack 143, is closed such that the liquid supplied to the jack chamber 142 is stored in the jack chamber 142, and opens such that the liquid supplied to the jack chamber 142 is discharged to the liquid reservoir chamber 143a formed in the hydraulic jack 143. The rear wheel side solenoid valve 170 will be described later. In addition, the liquid discharged to the liquid reservoir chamber 143a returns to the inside of the cylinder 125.

Figure 4A:
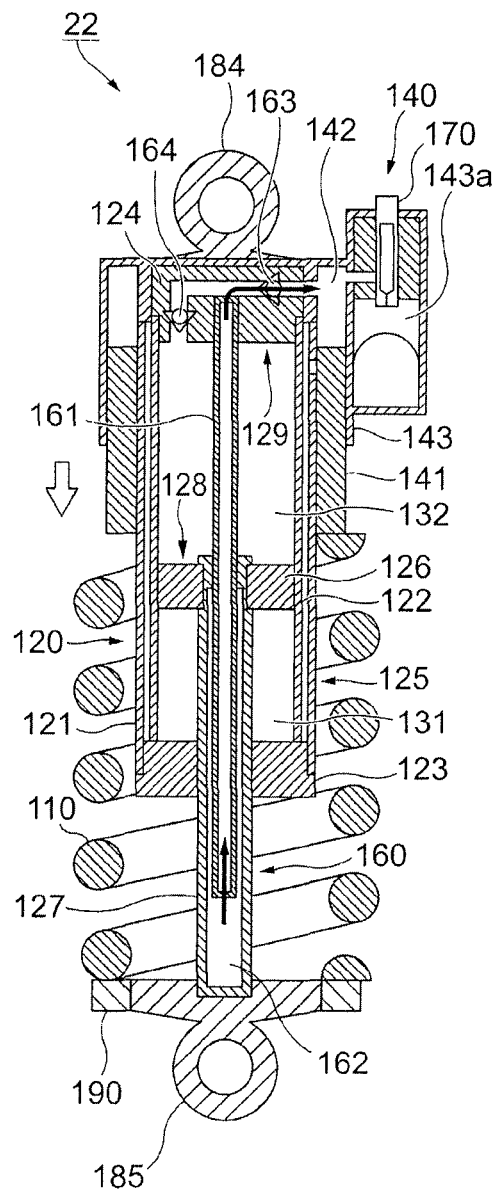
FIGS. 4A and 4B are views describing vehicle height adjustment performed by a rear wheel side relative position changing device.
Figure 4B:
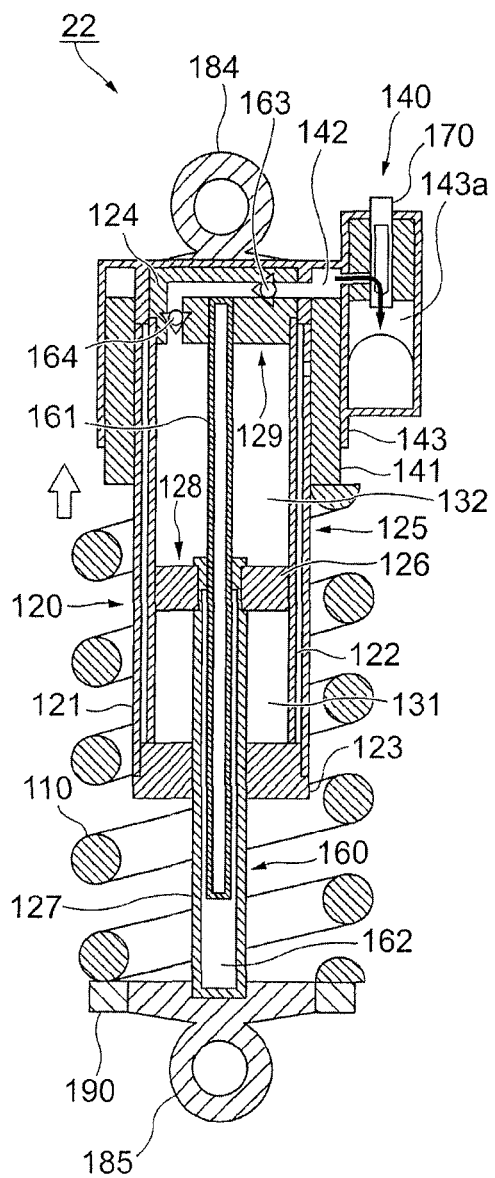

FIGS. 4A and 4B are views describing vehicle height adjustment performed by the rear wheel side relative position changing device 140.

When the rear wheel side solenoid valve 170 is at least in a closed state from the completely open state, the inside of the jack chamber 142 is filled with the liquid when the liquid is supplied to the inside of the jack chamber 142 by the rear wheel side liquid supply device 160, the support member 141 moves to one end portion side (lower side in FIG. 4A) in the center line direction with respect to the hydraulic jack 143, and a spring length of the rear wheel side suspension spring 110 becomes short (refer to FIG. 4A). Meanwhile, when the rear wheel side solenoid valve 170 is completely open, the liquid in the jack chamber 142 is discharged to the liquid reservoir chamber 143a, the support member 141 moves to the other end portion side (upper side in FIG. 4B) in the center line direction with respect to the hydraulic jack 143, and the spring length of the rear wheel side suspension spring 110 becomes long (refer to FIG. 4B).

When the spring length of the rear wheel side suspension spring 110 becomes short as the support member 141 moves with respect to the hydraulic jack 143, compared to that before the support member 141 moves with respect to the hydraulic jack 143, the spring force by which the rear wheel side suspension spring 110 pushes the support member 141 increases. As a result, an initial load which does not change the relative position therebetween is switched even when the force acts to the rear wheel 21 side from the vehicle body frame 11. In this case, in a case where the same force acts on one end portion side (lower sides in FIGS. 4A and 4B) in the center line direction from the vehicle body frame 11 (seat 19) side, an amount of compression of the rear suspension 22 (change in distance between the vehicle body side mounting member 184 and the axle side mounting member 185) decreases. Therefore, when the spring length of the rear wheel side suspension spring 110 becomes short as the support member 141 moves with respect to the hydraulic jack 143, compared to that before the support member 141 moves with respect to the hydraulic jack 143, the height of the seat 19 is raised (the vehicle height is raised). In other words, the vehicle height is raised as the opening degree of the rear wheel side solenoid valve 170 decreases.

Meanwhile, when the spring length of the rear wheel suspension spring 110 increases as the support member 141 moves with respect to the hydraulic jack 143, compared to that before the support member 141 moves with respect to the hydraulic jack 143, the spring force by which the rear wheel side suspension spring 110 pushes the support member 141 decreases. In this case, in a case where the same force acts on one end portion side (lower sides in FIGS. 4A and 4B) in the center line direction from the vehicle body frame 11 (seat 19) side, the amount of compression of the rear suspension 22 (change in distance between the vehicle body side mounting member 184 and the axle side mounting member 185) increases. Therefore, when the spring length of the rear wheel side suspension spring 110 becomes long as the support member 141 moves with respect to the hydraulic jack 143, compared to that before the support member 141 moves with respect to the hydraulic jack 143, the height of the seat 19 is lowered (vehicle height is lowered). In other words, the vehicle height is lowered in accordance with an increase in opening degree of the rear wheel side solenoid valve 170.

In addition, opening and closing or an opening degree of the rear wheel side solenoid valve 170 is controlled by the control device 50.

When the rear wheel side solenoid valve 170 is open, a destination of the discharge of the liquid supplied to the jack chamber 142 may be the first oil chamber 131 and/or the second oil chamber 132 in the cylinder 125.

As illustrated in FIG. 2, a return path 121a is formed in the outer cylinder 121 of the cylinder 125. When the support member 141 moves to a limit position set in advance on one end portion side (lower side in FIG. 2) in the center line direction with respect to the hydraulic jack 143, the liquid in the jack chamber 142 returns to the inside of the cylinder 125 through the return path 121a.

Figure 5:
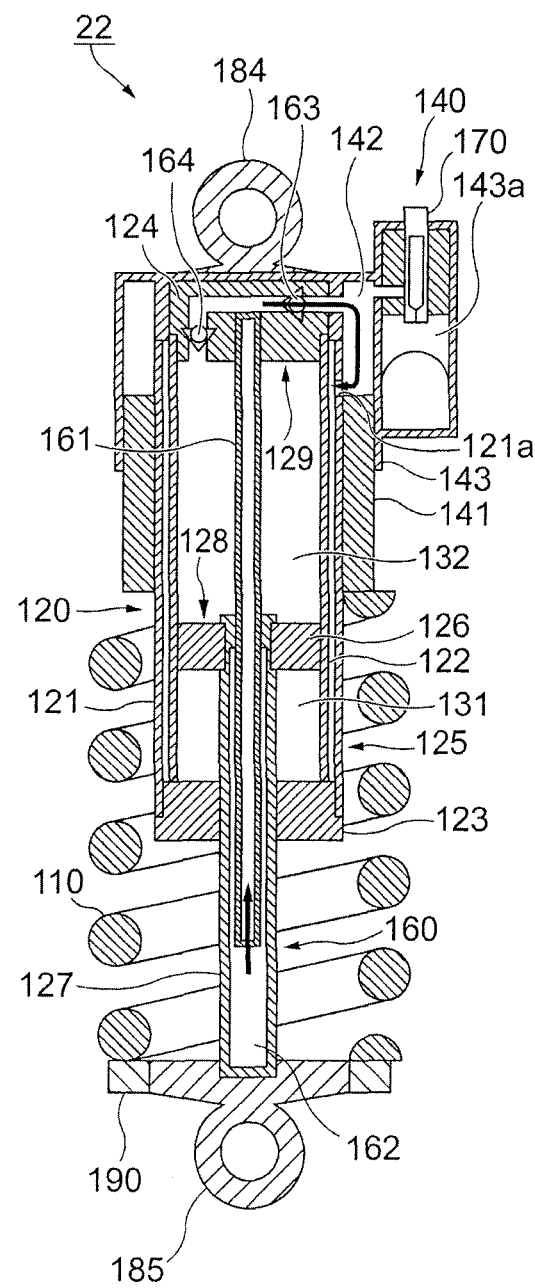
FIG. 5 is a view illustrating a mechanism in which the vehicle height is maintained.

FIG. 5 is a view illustrating a mechanism in which the vehicle height is maintained.

Even when the liquid is continuously supplied to the inside of the jack chamber 142 when the rear wheel side solenoid valve 170 is completely closed by the return path 121a, the position of the support member 141 with respect to the hydraulic jack 143 and the height (vehicle height) of the seat 19 are maintained since the supplied liquid returns to the inside of the cylinder 125.

Hereinafter, a state of the rear suspension 22 when the rear wheel side solenoid valve 170 becomes completely open and the movement amount of the support member 141 with respect to the hydraulic jack 143 is the minimum (zero) is referred to as a minimum state, and a state of the rear suspension 22 when the rear wheel side solenoid valve 170 is completely closed and the movement amount of the support member 141 with respect to the hydraulic jack 143 is the maximum is referred to as a maximum state.

Figure 12:
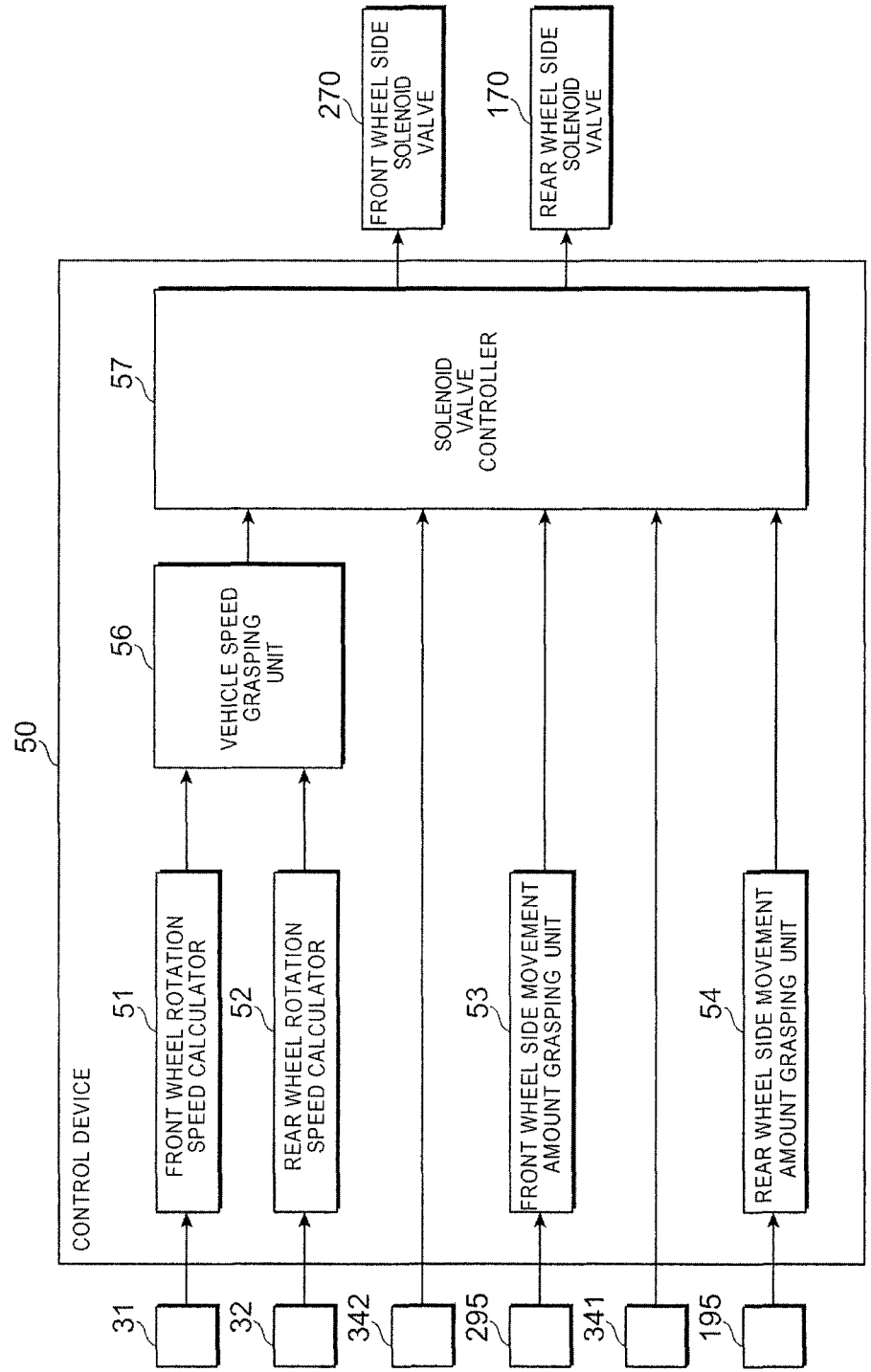
FIG. 12 is a block diagram of a control device.

In addition, the rear suspension 22 includes a rear wheel side relative position detector 195 (refer to FIG. 12). As the rear wheel side relative position detector 195, a member which detects the movement amount of the support member 141 in the center line direction with respect to the hydraulic jack 143, that is, the movement amount of the support member 141 in the center line direction with respect to the vehicle body side mounting member 184 can be employed. Specifically, a member around which a coil is wound on the outer circumferential surface of the support member 141, which considers the hydraulic jack 143 as a magnetic body, and which detects the movement amount of the support member 141 based on an impedance of the coil that changes in accordance with the movement of the support member 141 in the center line direction with respect to the hydraulic jack 143, can be employed.

Furthermore, the rear suspension 22 includes a rear wheel side length change amount detector 341 (refer to FIGS. 6 and 12) which detects a change amount of the entire length (or the spring length of the rear wheel side suspension spring 110) of the rear suspension 22 by advance and retreat of the piston rod 127 with respect to the cylinder 125 and the pipe 161 as an example of an information obtaining device. As the rear wheel side length change amount detector 341, a member which detects the movement amount (that is, an expansion and contraction amount of the rear wheel side suspension spring 110) of the piston rod 127 with respect to the cylinder 125 can be employed. Specifically, a so-called known suspension stroke sensor can be employed as an example. When a load is applied to the motorcycle 1, the rear wheel side suspension spring 110 of the rear suspension 22 is compressed, and the entire length of the rear suspension 22 becomes short. In addition, the vehicle height of the motorcycle 1 is lowered as much as the rear suspension 22 becomes short. In other words, the length of the rear suspension 22 and the vehicle height of the motorcycle 1 are directly associated with each other. Here, by averaging the detection result of the rear wheel side length change amount detector 341 for a sufficiently long period of time by a frequency of vibration of the normal mode of the rear wheel side suspension spring 110 (low pass filter), influence of fine expanding and contracting vibration of the rear suspension 22 caused by roughness or the like of a road surface is removed. In the embodiment, correction of the vehicle height adjustment is performed by the above-described rear wheel side relative position changing device 140 as necessary based on the change amount of the length of the rear suspension 22. Specific contents of the correction of the vehicle height adjustment according to the embodiment will be described later.

Figure 6:
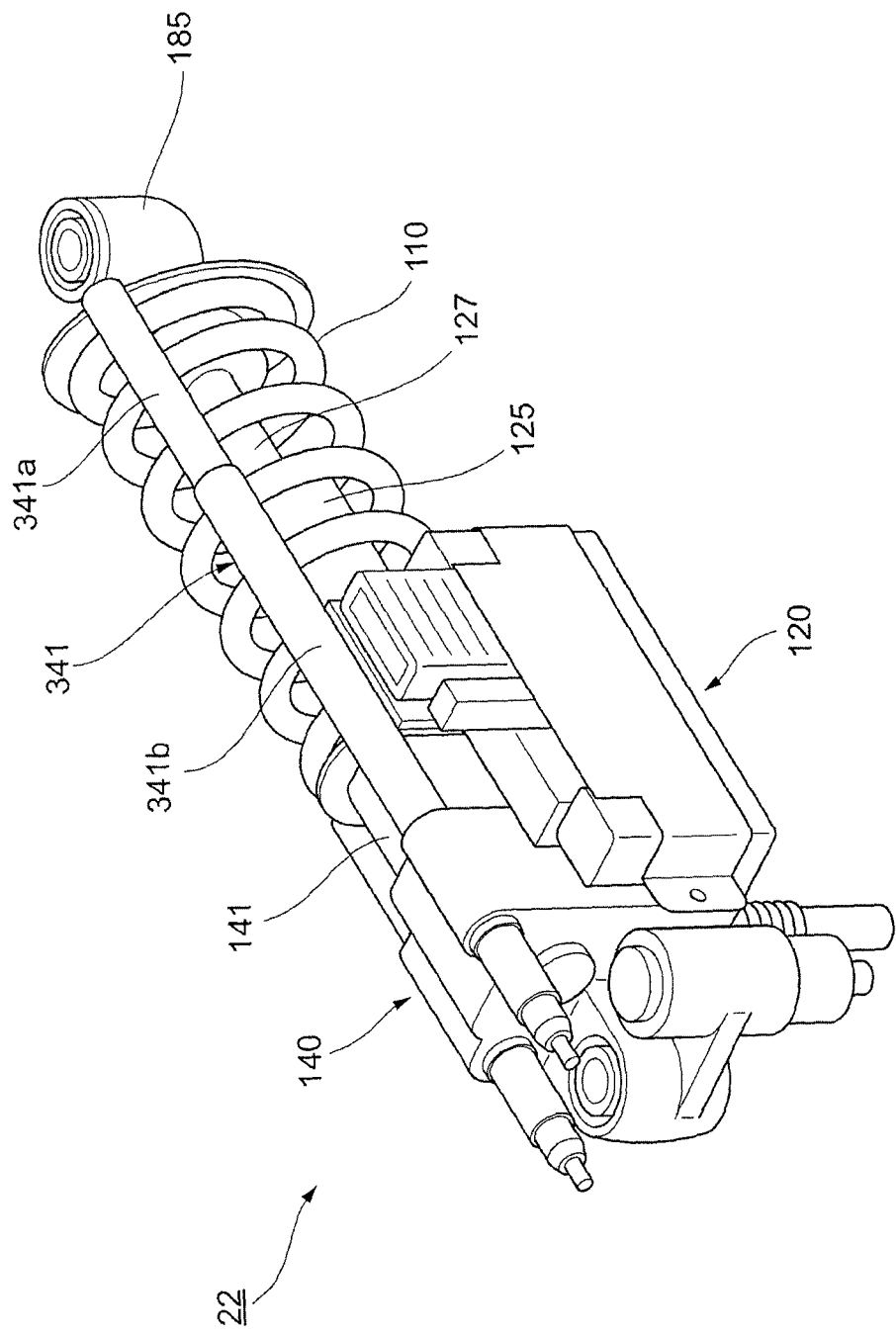
FIG. 6 is a view illustrating an example of a suspension stroke sensor which is used as a rear wheel side length change amount detector.

FIG. 6 is a view illustrating an example of the suspension stroke sensor which is used as the rear wheel side length change amount detector 341.

The rear wheel side length change amount detector 341 illustrated in FIG. 6 is configured of two pipes 341a and 341b by inserting one pipe 341a into the other pipe 341b to be slidable. An end portion of the pipe 341a which is not inserted into the pipe 341b is connected to the axle side mounting member 185 of the rear suspension 22. In addition, an end portion of the pipe 341b into which the pipe 341a is not inserted is connected to the rear wheel side damper 120 of the rear suspension 22. Accordingly, the rear wheel side length change amount detector 341 expands and contracts due to the advance and retreat of the pipe 341a with respect to the pipe 341b in accordance with the expansion and contraction (advance and retreat of the piston rod 127 with respect to the cylinder 125) of the rear suspension 22.

In addition, the rear wheel side length change amount detector 341 detects the movement amount of the pipe 341a with respect to the pipe 341b during the advance and retreat. Specifically, the coil is wound on the outer circumferential surface of the pipe 341a, and the pipe 341b is made of a magnetic material. An example of the rear wheel side length change amount detector 341 is one which detects the movement amount of the pipe 341a based on the impedance of the coil that changes in accordance with the movement of the pipe 341a with respect to the pipe 341b. In addition, the configuration of the rear wheel side length change amount detector 341 which is described with reference to FIG. 6 is merely an example, and is not limited to the configuration which is illustrated in the drawing and described above. As illustrated in FIG. 6, various known suspension stroke sensors may be used. For example, the sensor may not provided together with the rear suspension 22, but the movement amount of the piston rod 127 with respect to the cylinder 125 of the rear suspension 22 may be directly detected. Furthermore, as the rear wheel side length change amount detector 341, various configurations different from a known suspension stroke sensor which can detect the movement amount of the piston rod 127 with respect to the cylinder 125 may be employed.

Next, the front fork 10 will be described.

Figure 7:
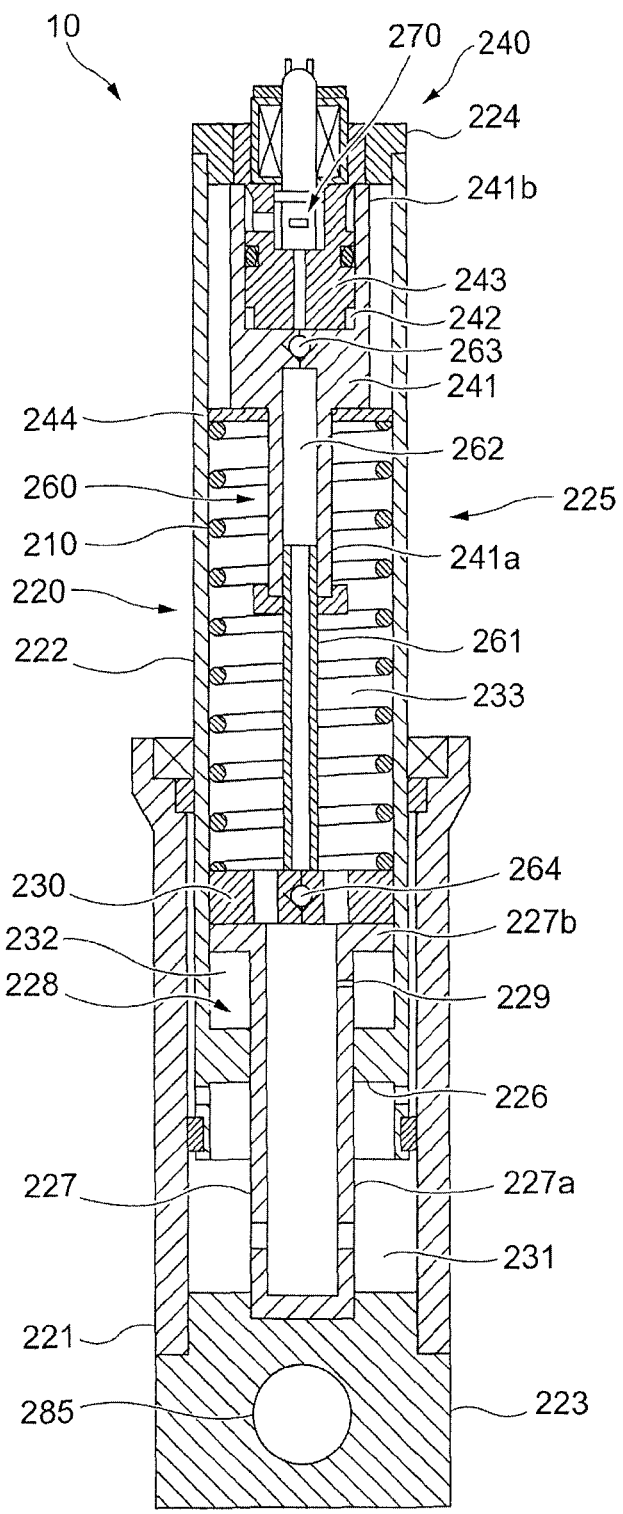
FIG. 7 is a sectional view of a front fork.

FIG. 7 is a sectional view of the front fork 10.

The front fork 10 is mounted between the vehicle body frame 11 and the front wheel 14. In addition, the front fork 10 includes a front wheel side suspension spring 210 and a front wheel side damper 220. The front wheel side suspension spring 210 supports the vehicle weight of the motorcycle 1 and absorbs shock. The front wheel side damper 220 damps vibration of the front wheel side suspension spring 210. In addition, the front fork 10 includes the front wheel side relative position changing device 240 and the front wheel side liquid supply device 260. The front wheel side relative position changing device 240 can change the front wheel side relative position that is a relative position between the vehicle body frame 11 and the front wheel 14 by adjusting the spring force of the front wheel side suspension spring 210. The front wheel side liquid supply device 260 supplies the liquid to the front wheel side relative position changing device 240. In addition, the front fork 10 includes an axle side mounting portion 285 and a fork pipe side mounting portion (not illustrated). The axle side mounting portion 285 is used to mount the front fork 10 on the front wheel 14. The fork pipe side mounting portion is used to mount the front fork 10 on the fork pipe 12. The front fork 10 functions as an example of changing means for changing the relative position between the vehicle body frame 11 and the front wheel 14. The front fork 10 functions as an example of changing means and front wheel side changing means for being capable of changing the relative position between the vehicle body frame 11 and the front wheel 14 which is an example of a wheel.

As illustrated in FIG. 7, the front wheel side damper 220 includes a cylinder 225. The cylinder 225 includes a thin cylindrical outer cylinder 221, a thin cylindrical inner cylinder 222, a bottom lid 223 and an upper lid 224. One end portion of the inner cylinder 222 (lower portion in FIG. 7) is inserted from the other end portion (upper portion in FIG. 7), in the center line direction (upward-and-downward direction in FIG. 7), of the outer cylinder 221 having a cylindrical shape. The bottom lid 223 blocks one end portion (lower portion in FIG. 7), in the center line direction, of the outer cylinder 221. The upper lid 224 blocks the other end portion (upper portion in FIG. 7), in the center line direction, of the inner cylinder 222. The inner cylinder 222 is inserted to be slidable with respect to the outer cylinder 221.

In addition, the front wheel side damper 220 includes a piston rod 227 which is mounted on the bottom lid 223 to extend in the center line direction. The piston rod 227 includes a cylindrical portion 227a which has a cylindrical shape and which extends in the center line direction, and a disk-shaped flange portion 227b which is provided in the other end portion (upper portion in FIG. 7), in the center line direction, of the cylindrical portion 227a.

In addition, the front wheel side damper 220 includes a piston 226. The piston 226 is fixed to one end portion side (lower portion side in FIG. 7), in the center line direction, of the inner cylinder 222. The piston 226 is slidable with respect to the outer circumference of the cylindrical portion 227a of the piston rod 227. The piston 226 comes into contact with the outer circumferential surface of the cylindrical portion 227a of the piston rod 227, and divides a space in which the liquid (oil in the embodiment) in the cylinder 225 is sealed into (i) a first oil chamber 231 which is on one end portion side, in the center line direction, of the piston 226 and (ii) a second oil chamber 232 which is on the other end portion side, in the center line direction, of the piston 226. In addition, the oil functions as an example of working oil in the embodiment.

In addition, the front wheel side damper 220 includes a cover member 230 which is provided above the piston rod 227 and which covers an opening of the cylindrical portion 227a of the piston rod 227. The cover member 230 supports one end portion (lower end portion in FIG. 7), in the center line direction, of the front wheel side suspension spring 210. In addition, the front wheel side damper 220 includes an oil reservoir chamber 233. The oil reservoir chamber 233 is formed in a space on the other end portion side, in the center line direction, of the cover member 230 in the inner cylinder 222 and in a space on the inside of the cylindrical portion 227a of the piston rod 227. The oil reservoir chamber 233 communicates with the first oil chamber 231 and the second oil chamber 232.

In addition, the front wheel side damper 220 includes a first damping force generation portion 228 and a second damping force generation portion 229. The first damping force generation portion 228 is provided in the piston 226. The second damping force generation portion 229 is formed in the piston rod 227. The first damping force generation portion 228 and the second damping force generation portion 229 damp the expanding and contracting vibration of the inner cylinder 222 and the piston rod 227 which follows the absorption of impact from the road surface by the front wheel side suspension spring 210. The first damping force generation portion 228 is disposed to function as a connection path between the first oil chamber 231 and the second oil chamber 232. The second damping force generation portion 229 is formed to function as a connection path between the first oil chamber 231, the second oil chamber 232, and the oil reservoir chamber 233.

The front wheel side liquid supply device 260 is a device which supplies the liquid to the inside of a jack chamber 242 that will be described later of the front wheel side relative position changing device 240 by performing a pumping operation by the expanding and contracting vibration of the piston rod 227 with respect to the inner cylinder 222.

The front wheel side liquid supply device 260 includes a cylindrical pipe 261 which is fixed to extend in the center line direction to the cover member 230 of the front wheel side damper 220. The pipe 261 is coaxially inserted into a pump chamber 262 which is the inside of a lower side cylindrical portion 241a of a support member 241 of the front wheel side relative position changing device 240 which will be described later.

In addition, the front wheel side liquid supply device 260 includes a discharge check valve 263 which discharges the liquid in the pump chamber 262 pressurized by the movement of the piston rod 227 in the direction of entering the inner cylinder 222 to the jack chamber 242 side (which will be described later), and a suction check valve 264 which absorbs the liquid in the oil reservoir chamber 233 to the pump chamber 262 of which the pressure becomes negative due to the movement of the piston rod 227 in the direction of retreating from the inner cylinder 222.

FIGS. 8A and 8B are views describing an operation of the front wheel side liquid supply device 260.

The front wheel side liquid supply device 260 configured as described above performs the pumping operation as the pipe 261 advances and retreats to the support member 241 of the front wheel side relative position changing device 240 when the motorcycle 1 travels, a force is applied to the front fork 10 by the roughness of the road surface, and the piston rod 227 advances and retreats to the inner cylinder 222. By the pumping operation, when the pump chamber 262 is pressurized, the liquid in the pump chamber 262 opens the discharge check valve 263 and is discharged to the jack chamber 242 side of the front wheel side relative position changing device 240 (refer to FIG. 8A), and when the pressure in the pump chamber 262 becomes negative, the liquid in the oil reservoir chamber 233 opens the suction check valve 264 and is suctioned to the pump chamber 262 (refer to FIG. 8B).

The front wheel side relative position changing device 240 includes the support member 241. The support member 241 is disposed in the inner cylinder 222 of the front wheel side damper 220. The support member 241 supports the other end portion (upper portions in FIGS. 8A and 8B), in the center line direction, of the front wheel side suspension spring 210 via a disk-shaped spring bearing 244. The support member 241 includes the lower side cylindrical portion 241a and an upper side cylindrical portion 241b. The lower side cylindrical portion 241a is formed in a cylindrical shape on one end portion side thereof (lower portion sides in FIGS. 8A and 8B) in the center line direction. The upper side cylindrical portion 241b is formed in a cylindrical shape on the other end portion side thereof (upper portion sides in FIGS. 8A and 8B) in the center line direction. The pipe 261 is inserted into the lower side cylindrical portion 241a.

In addition, the front wheel side relative position changing device 240 includes a hydraulic jack 243 which is fitted to the upper side cylindrical portion 241b of the support member 241 and forms both the support member 241 and the jack chamber 242. As the liquid fills the inside of the cylinder 225 in the jack chamber 242 or the liquid is discharged from the inside of the jack chamber 242, the support member 241 moves in the center line direction with respect to the hydraulic jack 243. In addition, in the hydraulic jack 243, a fork pipe side mounting portion (not illustrated) is mounted on the upper portion thereof, and as the support member 241 moves in the center line direction with respect to the hydraulic jack 243, the spring force of the front wheel side suspension spring 210 changes, and as a result, a relative position of the seat 19 with respect to the front wheel 14 changes.

In addition, the front wheel side relative position changing device 240 includes the front wheel side solenoid valve 270 which is a solenoid valve (solenoid valve) that is provided on the circulation path of a fluid between the jack chamber 242 and the oil reservoir chamber 233, is closed such that the liquid supplied to the jack chamber 242 is stored in the jack chamber 242, and opens such that the liquid supplied to the jack chamber 242 is discharged to the oil reservoir chamber 233. The front wheel side solenoid valve 270 will be described later in detail.

FIGS. 9A and 9B are views describing the vehicle height adjustment performed by the front wheel side relative position changing device 240.

When the front wheel side solenoid valve 270 is at least in a closed state from the completely open state, the inside of the jack chamber 242 is filled with the liquid when the liquid is supplied to the inside of the jack chamber 242 by the front wheel side liquid supply device 260, the support member 241 moves to one end portion side (lower side in FIG. 9A) in the center line direction with respect to the hydraulic jack 243, and a spring length of the front wheel side suspension spring 210 becomes short (refer to FIG. 9A). Meanwhile, when the front wheel side solenoid valve 270 is completely open, the liquid in the jack chamber 242 is discharged to the oil reservoir chamber 233, the support member 241 moves to the other end portion side (upper side in FIG. 9B) in the center line direction with respect to the hydraulic jack 243, and the spring length of the front wheel side suspension spring 210 becomes long (refer to FIG. 9B).

When the spring length of the front wheel side suspension spring 210 becomes short as the support member 241 moves with respect to the hydraulic jack 243, compared to that before the support member 241 moves with respect to the hydraulic jack 243, the spring force by which the front wheel side suspension spring 210 pushes the support member 241 increases. As a result, an initial load which does not change both of the relative positions is switched even when the force acts to the front wheel 14 side from the vehicle body frame 11. In this case, in a case where the same force acts on one end portion side (lower sides in FIGS. 9A and 9B) in the center line direction from the vehicle body frame 11 (seat 19) side, an amount of compression of the front fork 10 (change in distance between the fork pipe side mounting portion (not illustrated) and the axle side mounting portion 285) decreases. Therefore, when the spring length of the front wheel side suspension spring 210 becomes short as the support member 241 moves with respect to the hydraulic jack 243, compared to that before the support member 241 moves with respect to the hydraulic jack 243, the height of the seat 19 is raised (the vehicle height is raised). In other words, the vehicle height is raised as the opening degree of the front wheel side solenoid valve 270 decreases.

Meanwhile, when the spring length of the front wheel side suspension spring 210 increases as the support member 241 moves with respect to the hydraulic jack 243, compared to that before the support member 241 moves with respect to the hydraulic jack 243, the spring force by which the front wheel side suspension spring 210 pushes the support member 241 decreases. In this case, in a case where the same force acts on one end portion side (lower sides in FIGS. 9A and 9B) in the center line direction from the vehicle body frame 11 (seat 19) side, the amount of compression (change in distance between the fork pipe side mounting portion (not illustrated) and the axle side mounting portion 285) of the front fork 10 increases. Therefore, when the spring length of the front wheel side suspension spring 210 becomes long as the support member 241 moves with respect to the hydraulic jack 243, compared to that before the support member 241 moves with respect to the hydraulic jack 243, the height of the seat 19 is lowered (vehicle height is lowered). In other words, the vehicle height is lowered in accordance with an increase in opening degree of the front wheel side solenoid valve 270.

In addition, opening and closing or an opening degree of the front wheel side solenoid valve 270 is controlled by the control device 50.

When the front wheel side solenoid valve 270 is open, a destination of the discharge of the liquid supplied to the jack chamber 242 may be the first oil chamber 231 and/or the second oil chamber 232.

Figure 10:
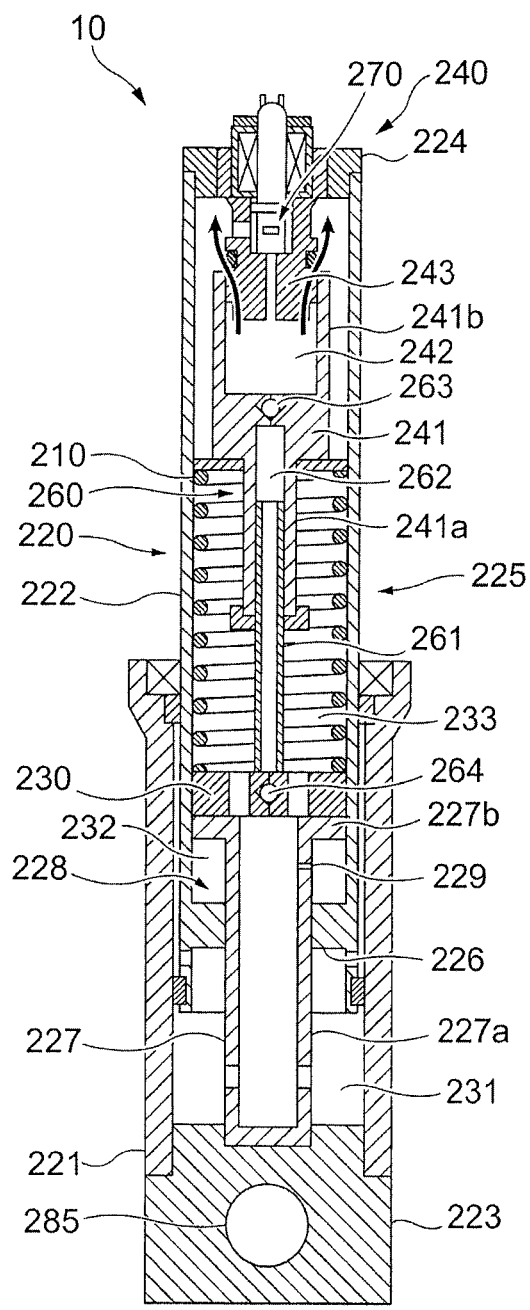
FIG. 10 is a view illustrating a mechanism in which the vehicle height is maintained.

FIG. 10 is a view illustrating a mechanism in which the vehicle height is maintained.

A return path (not illustrated) is formed on the outer circumferential surface of the hydraulic jack 243. As illustrated in FIG. 10, when the support member 241 moves to a limit position set in advance on one end portion side (lower sides in FIGS. 9A and 9B) in the center line direction with respect to the hydraulic jack 243, the liquid in the jack chamber 242 returns to the inside of the oil reservoir chamber 233 through the return path through.

By the return path, even when the liquid is continuously supplied to the inside of the jack chamber 242 when the front wheel side solenoid valve 270 is open, the position of the support member 241 with respect to the hydraulic jack 243 and the height (vehicle height) of the seat 19 are maintained since the supplied liquid returns to the inside of the oil reservoir chamber 233.

Hereinafter, a state of the front fork 10 when the front wheel side solenoid valve 270 becomes completely open and the movement amount of the support member 241 with respect to the hydraulic jack 243 is the minimum (zero) is referred to as a minimum state, and a state of the front fork 10 when the front wheel side solenoid valve 270 is completely closed and the movement amount of the support member 241 with respect to the hydraulic jack 243 is the maximum is referred to as a maximum state.

In addition, the front fork 10 includes a front wheel side relative position detector 295 (refer to FIG. 12). As the front wheel side relative position detector 295, a member which detects the movement amount of the support member 241 in the center line direction with respect to the hydraulic jack 243, that is, the movement amount of the support member 241 in the center line direction with respect to the fork pipe side mounting portion can be employed. Specifically, a member around which a coil is wound on the outer circumferential surface of the inner cylinder 222 at a position in the radial direction and at a position which corresponds to the support member 241 at a position in the center line direction, which considers the support member 241 as a magnetic body, and which detects the movement amount of the support member 241 based on an impedance of the coil that changes in accordance with the movement of the support member 241 in the center line direction with respect to the hydraulic jack 243, can be employed.

Furthermore, the front fork 10 includes a front wheel side length change amount detector 342 (refer to FIG. 12) which detects a change amount of the entire length (or the spring length of the front wheel side suspension spring 210) of the front fork 10 by advance and retreat of the piston rod 227 with respect to the inner cylinder 222 as an example of an information obtaining device. As the front wheel side length change amount detector 342, a member which detects the movement amount (that is, an expansion and contraction amount of the front wheel side suspension spring 210) of the piston rod 227 with respect to the inner cylinder 222 can be employed. Specifically, a so-called known suspension stroke sensor can be employed as an example. When a load is applied to the motorcycle 1, the front wheel side suspension spring 210 of the front fork 10 is compressed, and the entire length of the front fork 10 becomes short. In addition, the vehicle height of the motorcycle 1 is lowered as much as the front fork 10 becomes short. In other words, the length of the front fork 10 and the vehicle height of the motorcycle 1 are directly associated with each other. Here, by averaging the detection result of the front wheel side length change amount detector 342 for a sufficiently long period of time by a frequency of vibration of the normal mode of the front wheel side suspension spring 210 (low pass filter), influence of fine expanding and contracting vibration of the front fork 10 caused by roughness or the like of a road surface is removed. In the embodiment, correction of the vehicle height adjustment is performed by the above-described front wheel side relative position detector 295 as necessary based on a change amount of the length of the front fork 10. Specific contents of the correction of the vehicle height adjustment according to the embodiment will be described later. In addition, although not being particularly illustrated, as the front wheel side length change amount detector 342, a suspension stroke sensor can be used according to a configuration similar to that of the rear wheel side length change amount detector 341 described with reference to FIG. 6. In addition, various known suspension stroke sensors may be used. For example, a sensor may not be provided together with the front fork 10, but the movement amount of the piston rod 227 with respect to the inner cylinder 222 of the front fork 10 may be directly detected. Furthermore, as the front wheel side length change amount detector 342, various configurations different from a known suspension stroke sensor which can detect the movement amount of the piston rod 227 with respect to the inner cylinder 222 may be employed.

Next, configurations of the front wheel side solenoid valve 270 of the front wheel side relative position changing device 240 and the rear wheel side solenoid valve 170 of the rear wheel side relative position changing device 140 will be described.

Figure 11:
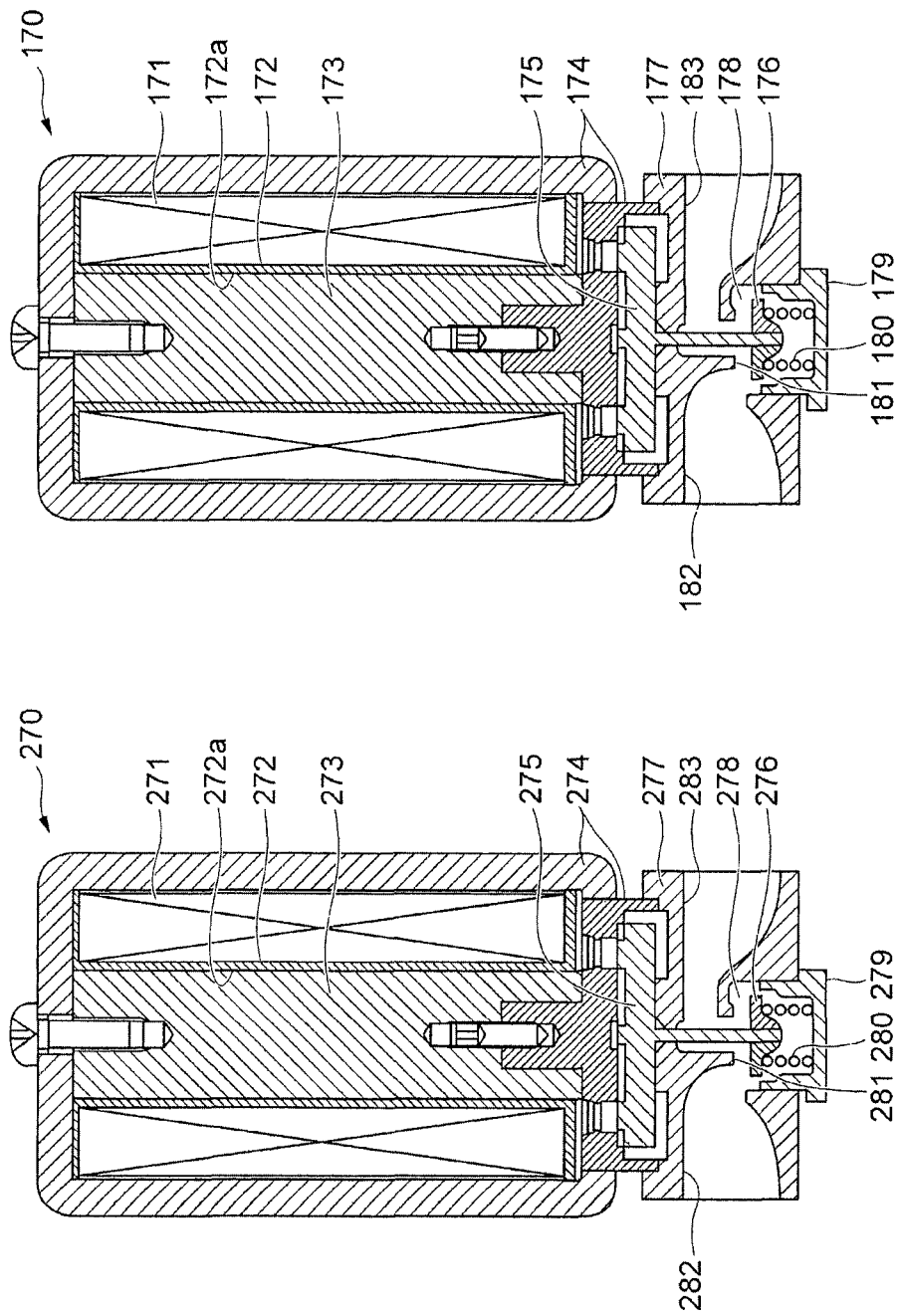
FIG. 11A is a view illustrating a schematic configuration of a front wheel side solenoid valve.
FIG. 11B is a view illustrating a schematic configuration of a rear wheel side solenoid valve.

FIG. 11A is a view illustrating a schematic configuration of the front wheel side solenoid valve 270, and FIG. 11B is a view illustrating a schematic configuration of the rear wheel side solenoid valve 170.

The front wheel side solenoid valve 270 is a so-called normally open solenoid valve. As illustrated in FIG. 11A, the front wheel side solenoid valve 270 includes a bobbin 272, a bar-shaped fixed iron core 273, a holder 274, and a substantially disk-shaped movable iron core 275. A coil 271 is wound around the bobbin 272. The fixed iron core 273 is fixed to a hollow portion 272a of the bobbin 272. The holder 274 supports the coil 271, the bobbin 272, and the fixed iron core 273. The movable iron core 275 is disposed to correspond to a tip end (end surface) of the fixed iron core 273 and is suctioned to the fixed iron core 273. In addition, the front wheel side solenoid valve 270 includes a valve body 276, a body 277, a valve chamber 278, a cover member 279, and a coil spring 280. The valve body 276 is fixed to the tip end center of the movable iron core 275. The body 277 is assembled to the holder 274. The valve chamber 278 is formed in the body 277, and the valve body 276 is disposed in the valve chamber 278. The cover member 279 covers an opening portion formed in the body 277, collaborates with the body 277, and forms the valve chamber 278. The coil spring 280 is disposed between the valve body 276 and the cover member 279. In addition, the front wheel side solenoid valve 270 includes a valve seat 281, an introduction flow path 282, and a lead-out flow path 283. The valve seat 281 is formed in the body 277 and is disposed in the valve chamber 278 to correspond to the valve body 276. The introduction flow path 282 is formed in the body 277 and introduces a fluid to the valve chamber 278 from the jack chamber 242 (refer to FIG. 10). The lead-out flow path 283 is formed in the body 277 and leads out the fluid to the oil reservoir chamber 233 via the valve seat 281 from the valve chamber 278. In addition, the front wheel side solenoid valve 270 may be a normally closed solenoid valve.

The rear wheel side solenoid valve 170 is a so-called normally open solenoid valve. As illustrated in FIG. 11B, the rear wheel side solenoid valve 170 includes a bobbin 172, a bar-shaped fixed iron core 173, a holder 174, and a substantially disk-shaped movable iron core 175. A coil 171 is wound around the bobbin 172. The fixed iron core 173 is fixed to a hollow portion 172a of the bobbin 172. The holder 174 supports the coil 171, the bobbin 172, and the fixed iron core 173. The movable iron core 175 is disposed to correspond to the tip end (end surface) of the fixed iron core 173 and is suctioned to the fixed iron core 173. In addition, the rear wheel side solenoid valve 170 includes a valve body 176, a body 177, a valve chamber 178, a cover member 179, and a spring 180. The valve body 176 is fixed to the tip end center of the movable iron core 175. The body 177 is assembled to the holder 174. The valve chamber 178 is formed in the body 177, and the valve body 176 is disposed in the valve chamber 178. The cover member 179 covers an opening portion formed in the body 177, collaborates with the body 177, and forms the valve chamber 178. The coil spring 180 is disposed between the valve body 176 and the cover member 179. In addition, the rear wheel side solenoid valve 170 includes a valve seat 181, an introduction flow path 182, and a lead-out flow path 183. The valve seat 181 is formed in the body 177 and is disposed in the valve chamber 178 to correspond to the valve body 176. The introduction flow path 182 is formed in the body 177 and introduces a fluid to the valve chamber 178 from the jack chamber 142 (refer to FIG. 5). The lead-out flow path 183 is formed in the body 177 and leads out the fluid to the liquid reservoir chamber 143a via the valve seat 181 from the valve chamber 178. In addition, the rear wheel side solenoid valve 170 may be a normally closed solenoid valve.

During non-energization in which the front wheel side solenoid valve 270 and the rear wheel side solenoid valve 170 which are configured in this manner are not energized to the coils 271 and 171, since the movable iron cores 275 and 175 are biased downward in the drawing by the coil springs 280 and 180, the valve bodies 276 and 176 which are fixed to the tip end (end surface) of the movable iron cores 275 and 175 do not abut against the valve seats 281 and 181. Therefore, in the front wheel side solenoid valve 270 and the rear wheel side solenoid valve 170, the introduction flow paths 282 and 182 and the lead-out flow paths 283 and 183 communicate with each other, and is placed in a valve-open state. Meanwhile, during energization in which the front wheel side solenoid valve 270 and the rear wheel side solenoid valve 170 are energized to the coils 271 and 171, the movable iron cores 275 and 175 are displaced due to balance of a suction force of the fixed iron cores 273 and 173 when the coils 271 and 171 are excited by the energization and a biasing force of the coil springs 280 and 180. In the front wheel side solenoid valve 270 and the rear wheel side solenoid valve 170, the positions of the valve bodies 276 and 176 with respect to the valve seats 281 and 181, that is, the opening degrees of the valves are adjusted. The opening degrees of the valves are adjusted by changing power (current and voltage) supplied to the coils 271 and 171.

Next, the control device 50 will be described.

FIG. 12 is a block diagram of the control device 50.

The control device 50 includes a CPU, a ROM in which a program executed by the CPU and various pieces of data are stored, a RAM which is used as a working memory or the like of the CPU, and an EEPROM which is a nonvolatile memory. Output signals from the front wheel rotation detection sensor 31, the rear wheel rotation detection sensor 32, the front wheel side relative position detector 295, and the rear wheel side relative position detector 195 which are described above are input to the control device 50.

The control device 50 includes a front wheel rotation speed calculator 51 and a rear wheel rotation speed calculator 52. The front wheel rotation speed calculator 51 calculates a rotation speed of the front wheel 14 based on the output signal from the front wheel rotation detection sensor 31. The rear wheel rotation speed calculator 52 calculates a rotation speed of the rear wheel 21 based on the output signal from the rear wheel rotation detection sensor 32. The front wheel rotation speed calculator 51 and the rear wheel rotation speed calculator 52 respectively grasp a rotation angle based on a pulse signal which is the output signal from the sensor, and calculates the rotation speed by differentiating the rotation angle by the time elapsed.

The control device 50 includes a front wheel side movement amount grasping unit 53. The front wheel side movement amount grasping unit 53 grasps a front wheel side movement amount Lf which is the movement amount of the support member 241 of the front wheel side relative position changing device 240 (refer to FIGS. 9A and 9B) with respect to the hydraulic jack 243 based on the output signal from the front wheel side relative position detector 295. In addition, the control device 50 includes a rear wheel side movement amount grasping unit 54. The rear wheel side movement amount grasping unit 54 grasps a rear wheel side movement amount Lr which is the movement amount of the support member 141 of the rear wheel side relative position changing device 140 with respect to the hydraulic jack 143 based on the output signal from the rear wheel side relative position detector 195. The front wheel side movement amount grasping unit 53 and the rear wheel side movement amount grasping unit 54 can grasp each of the front wheel side movement amount Lf and the rear wheel side movement amount Lr, for example, based on a correlation between the impedance of the coil and the front wheel side movement amount Lf or the rear wheel side movement amount Lr which are stored in the ROM in advance.

In addition, the control device 50 includes a vehicle speed grasping unit 56. The vehicle speed grasping unit 56 grasps a vehicle speed Vc which is the movement speed of the motorcycle 1 based on the rotation speed of the front wheel 14 calculated by the front wheel rotation speed calculator 51 and/or the rotation speed of the rear wheel 21 calculated by the rear wheel rotation speed calculator 52. The vehicle speed grasping unit 56 grasps the vehicle speed Vc by calculating the movement speed of the front wheel 14 or the rear wheel 21 by using a front wheel rotation speed Rf and a rear wheel rotation speed Rr. The movement speed of the front wheel 14 can be calculated by using the front wheel rotation speed Rf and an outer diameter of a tire of the front wheel 14, and the movement speed of the rear wheel 21 can be calculated by using the rear wheel rotation speed Rr and the outer diameter of the tire of the rear wheel 21. In addition, in a case where the motorcycle 1 travels in a normal state, it can be understood that the vehicle speed Vc is equivalent to the movement speed of the front wheel 14 and/or the movement speed of the rear wheel 21. In addition, the vehicle speed grasping unit 56 may grasp the vehicle speed Vc by calculating an average movement speed of the front wheel 14 and the rear wheel 21 using an average value of the front wheel rotation speed Rf and the rear wheel rotation speed Rr.

In addition, the control device 50 includes a solenoid valve controller 57 which controls an opening degree of the front wheel side solenoid valve 270 of the front wheel side relative position changing device 240 and an opening degree of the rear wheel side solenoid valve 170 of the rear wheel side relative position changing device 140 based on the vehicle speed Vc grasped by the vehicle speed grasping unit 56. The solenoid valve controller 57 will be described later.

The front wheel rotation speed calculator 51, the rear wheel rotation speed calculator 52, the front wheel side movement amount grasping unit 53, the rear wheel side movement amount grasping unit 54, the vehicle speed grasping unit 56, and the solenoid valve controller 57 are realized as the CPU executes software stored in a storage area, such as the ROM.

Next, the solenoid valve controller 57 of the control device 50 will be described in detail.

Figure 13:
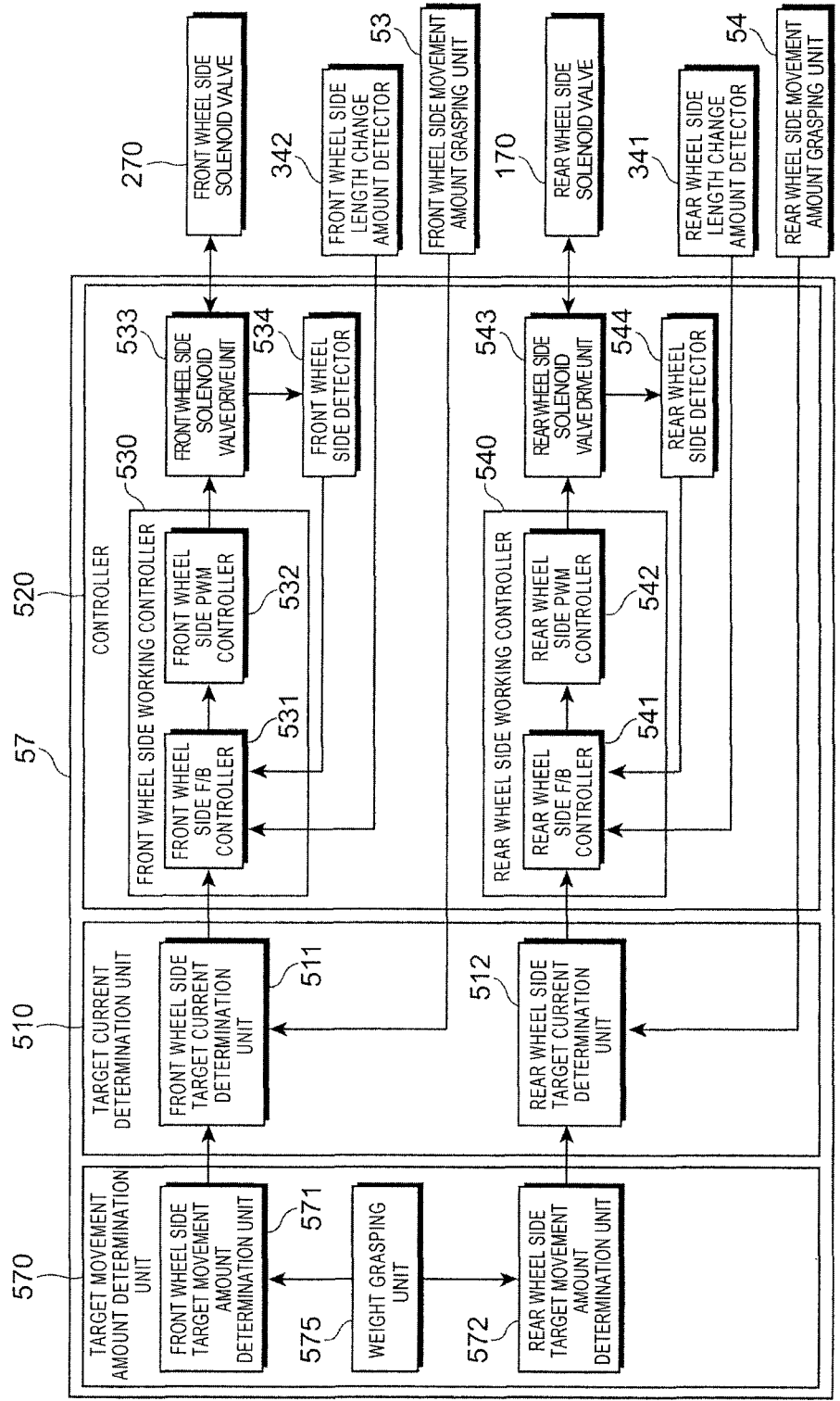
FIG. 13 is a block diagram of a solenoid valve controller according to the embodiment.

FIG. 13 is a block diagram of the solenoid valve controller 57 according to the embodiment.

The solenoid valve controller 57 includes a target movement amount determination unit 570 including a front wheel side target movement amount determination unit 571, a rear wheel side target movement amount determination unit 572, and a weight grasping unit 575. The front wheel side target movement amount determination unit 571 determines a front wheel side target movement amount that is a target movement amount (movement amount target value) of the front wheel side movement amount Lf. The rear wheel side target movement amount determination unit 572 determines a rear wheel side target movement amount that is a target movement amount of the rear wheel side movement amount Lr.

The weight grasping unit 575 grasps the weight applied to the motorcycle 1 that is an example of a vehicle. In addition, the solenoid valve controller 57 includes a target current determination unit 510 and a controller 520. The target current determination unit 510 determines a target current to be supplied to the front wheel side solenoid valve 270 of the front wheel side relative position changing device 240 and to the rear wheel side solenoid valve 170 of the rear wheel side relative position changing device 140. The controller 520 performs feedback control or the like based on a target current determined by the target current determination unit 510.

The target movement amount determination unit 570 determines the target movement amount based on the vehicle speed Vc grasped by the vehicle speed grasping unit 56 (refer to FIG. 12) and the weight applied to the motorcycle 1 grasped by the weight grasping unit 575.

The weight grasping unit 575 grasps the weight applied to the motorcycle 1 based on the weight input to an input device 34 provided in the motorcycle 1.

Figure 14:
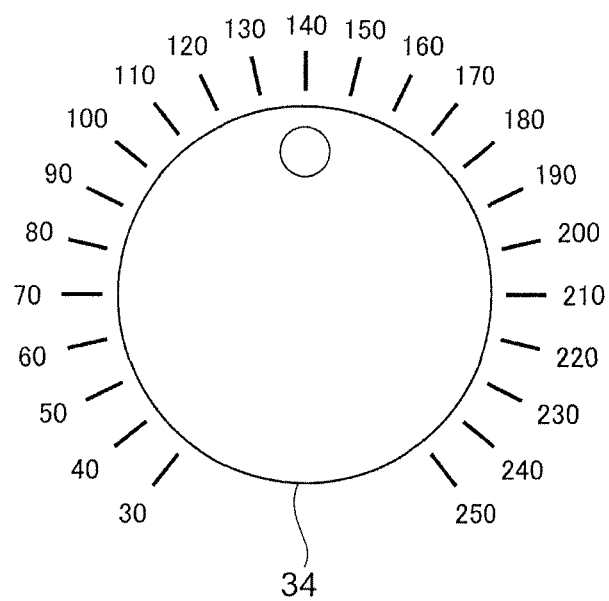
FIG. 14 is an external view of an input device.

FIG. 14 is an external view of the input device 34.

As illustrated in FIG. 14, for example, the input device 34 is a so-called dial type device around which the weight is described, and is configured to be capable of selecting the weight applied to the motorcycle 1 as a user rotates a handle. A driver estimates the weight applied to the motorcycle 1 considering a body weight of a person who gets on the motorcycle 1 or a weight of baggage transported by the motorcycle 1, and selects the estimated weight by the input device 34. The weight grasping unit 575 grasps that the weight selected by the input device 34 is a weight applied to the motorcycle 1. In addition, the input device 34 may be provided, for example, in the vicinity of a speed meter.

Figure 15A:
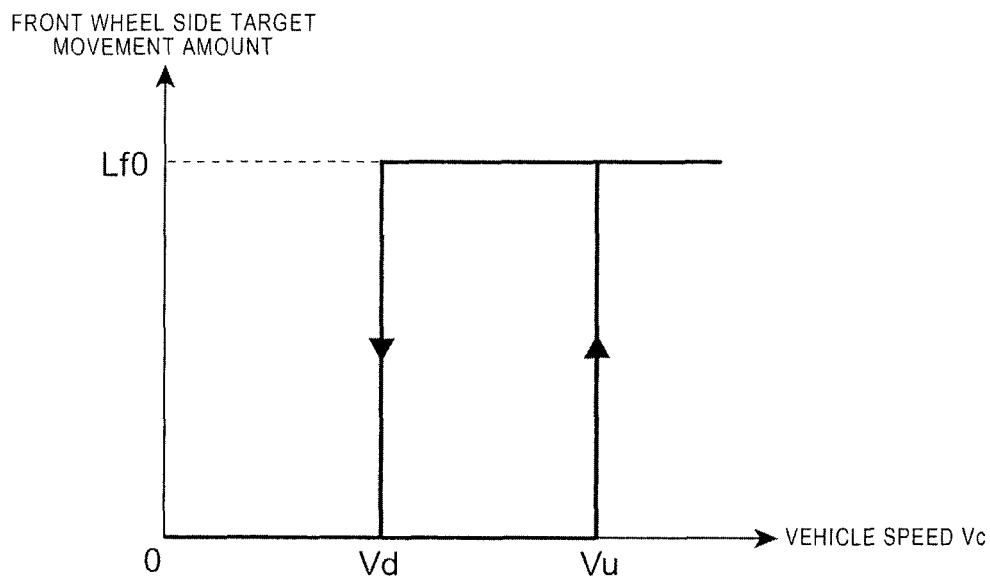
FIG. 15A is a view illustrating a correlation between a vehicle speed and a front wheel side target movement amount.
Figure 15B:
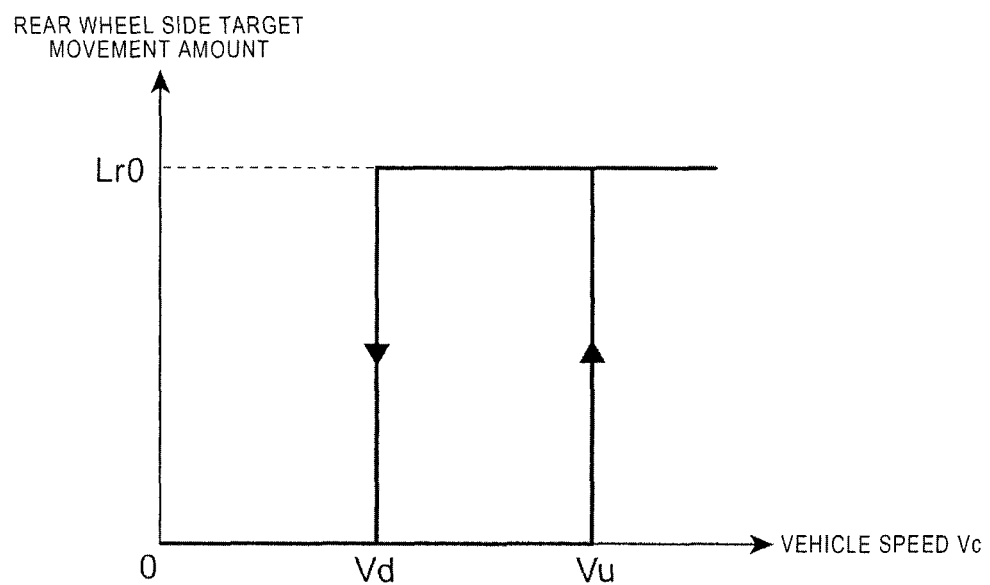
FIG. 15B is a view illustrating a correlation between the vehicle speed and a rear wheel side target movement amount.

FIG. 15A is a view illustrating a correlation between the vehicle speed Vc and the front wheel side target movement amount. FIG. 15B is a view illustrating a correlation between the vehicle speed Vc and the rear wheel side target movement amount.

Figure 16A:
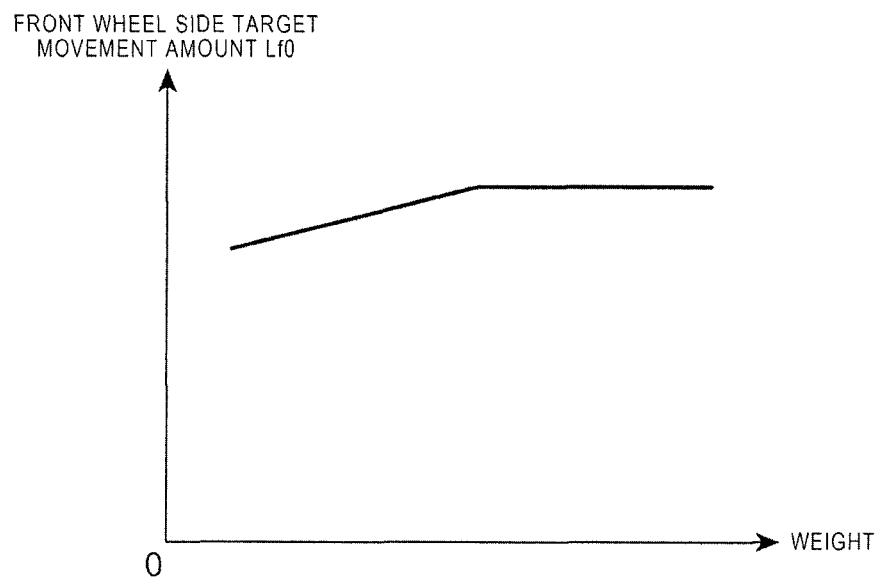
FIG. 16A is a view illustrating a relationship between a weight applied to the motorcycle and the front wheel side target movement amount.
Figure 16B:
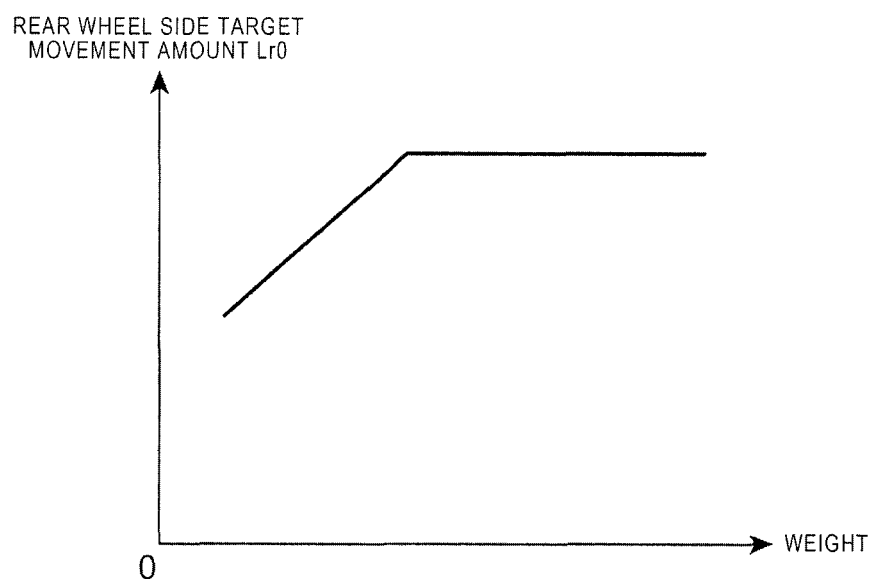
FIG. 16B is a view illustrating a relationship between the weight applied to the motorcycle and the rear wheel side target movement amount.

FIG. 16A is a view illustrating a relationship between the weight applied to the motorcycle 1 and a front wheel side target movement amount Lf0. FIG. 16B is a view illustrating a relationship between the weight applied to the motorcycle 1 and a rear wheel side target movement amount Lr0.

After the motorcycle 1 starts traveling, when the vehicle speed Vc grasped by the vehicle speed grasping unit 56 is lower than a raising speed Vu set in advance, the target movement amount determination unit 570 determines the target movement amount to be zero, and when the vehicle speed Vc becomes equal to or higher than the raising speed Vu from a state of being lower than the raising speed Vu, the target movement amount determination unit 570 determines the target movement amount to be a value set in advance in accordance with the weight applied to the motorcycle 1 grasped by the weight grasping unit 575. More specifically, as illustrated in FIG. 15A, in a case where the vehicle speed Vc becomes equal to or higher than the raising speed Vu from a state of being lower than the raising speed Vu, the front wheel side target movement amount determination unit 571 determines the front wheel side target movement amount to be the front wheel side target movement amount Lf0 set in advance as illustrated in FIG. 16A in accordance with the weight applied to the motorcycle 1. Meanwhile, as illustrated in FIG. 15B, in a case where the vehicle speed Vc becomes equal to or higher than the raising speed Vu from a state of being lower than the raising speed Vu, the rear wheel side target movement amount determination unit 572 determines the rear wheel side target movement amount to be the rear wheel side target movement amount Lr0 set in advance as illustrated in FIG. 16B in accordance with the weight applied to the motorcycle 1.

Hereinafter, while the vehicle speed Vc grasped by the vehicle speed grasping unit 56 is equal to or higher than the raising speed Vu, the front wheel side target movement amount determination unit 571 determines the front wheel side target movement amount to be the front wheel side target movement amount Lf0. In addition, the rear wheel side target movement amount determination unit 572 determines the rear wheel side target movement amount to be the rear wheel side target movement amount Lr0. A relationship between a selection position of the input device 34 and the weight applied to the motorcycle 1, and a relationship between the weight applied to the motorcycle 1 and the front wheel side target movement amount Lf0 and the rear wheel side target movement amount Lr0 as illustrated in FIGS. 16A and 16B, are stored in the ROM in advance. Since the vehicle height of the motorcycle 1 is determined in accordance with the front wheel side movement amount Lf and the rear wheel side movement amount Lr, in order to make the vehicle height to be a desirable vehicle height set in advance, an example in which the front wheel side target movement amount Lf0 and the rear wheel side target movement amount Lr0 are set in advance in accordance with the weight (selection position of the input device 34) added to the motorcycle 1 and are stored in the ROM, can be employed.

Meanwhile, the target movement amount determination unit 570 determines the target movement amount to be zero in a case where the vehicle speed becomes equal to or lower than a lowering speed Vd set in advance from a state where the motorcycle 1 travels at a vehicle speed which is equal to or higher than the raising speed Vu. In other words, the front wheel side target movement amount determination unit 571 determines the front wheel side target movement amount to be zero, and the rear wheel side target movement amount determination unit 572 determines the rear wheel side target movement amount to be zero. In addition, an example in which the raising speed Vu is 10 km/h and the lowering speed Vd is 8 km/h can be employed.

In addition, even in a case where the vehicle speed Vc grasped by the vehicle speed grasping unit 56 is higher than the lowering speed Vd, the target movement amount determination unit 570 determines the target movement amount to be zero in a case where the motorcycle 1 rapidly decelerates due to sudden braking. In other words, the front wheel side target movement amount determination unit 571 and the rear wheel side target movement amount determination unit 572 determine the front wheel side target movement amount and the rear wheel side target movement amount to be zero. It is possible to grasp whether or not the motorcycle 1 rapidly decelerates according to whether or not an amount of decrease per unit time of the vehicle speed Vc grasped by the vehicle speed grasping unit 56 is equal to or lower than a value set in advance.

The target current determination unit 510 includes a front wheel side target current determination unit 511 which determines a front wheel side target current that is a target current of the front wheel side solenoid valve 270 based on the front wheel side target movement amount determined by the front wheel side target movement amount determination unit 571, and a rear wheel side target current determination unit 512 which determines a rear wheel side target current that is a target current of the rear wheel side solenoid valve 170 based on the rear wheel side target movement amount determined by the rear wheel side target movement amount determination unit 572.

The front wheel side target current determination unit 511 determines the front wheel side target current by substituting the front wheel side target movement amount determined by the front wheel side target movement amount determination unit 571, for example, for a map illustrating correspondence between the front wheel side target movement amount and the front wheel side target current which is created based on an experimental rule in advance and stored in the ROM.

The rear wheel side target current determination unit 512 determines the rear wheel side target current by substituting the rear wheel side target movement amount determined by the rear wheel side target movement amount determination unit 572, for example, for a map illustrating correspondence between the rear wheel side target movement amount and the rear wheel side target current which is created based on an experimental rule in advance and stored in the ROM.

In addition, in a case where the front wheel side target movement amount is zero, the front wheel side target current determination unit 511 determines the front wheel side target current to be zero, and in a case where the rear wheel side target movement amount is zero, the rear wheel side target current determination unit 512 determines the rear wheel side target current to be zero. In addition, in a case where the front wheel side target movement amount is zero and the front wheel side target movement amount determined by the front wheel side target movement amount determination unit 571 changes to a value other than zero from a state where the front wheel side target current is determined to be zero, that is, in a case where the vehicle height starts to increase from a state of not being high, the front wheel side target current determination unit 511 determines the value to be the front wheel side target current which corresponds to the front wheel side target movement amount determined by the front wheel side target movement amount determination unit 571. Similarly, in a case where the rear wheel side target movement amount is zero and the rear wheel side target movement amount determined by the rear wheel side target movement amount determination unit 572 changes to a value other than zero from a state where the rear wheel side target current is determined to be zero, that is, in a case where the vehicle height starts to increase from a state of not being high, the rear wheel side target current determination unit 512 determines the value to be the rear wheel side target current which corresponds to the rear wheel side target movement amount determined by the rear wheel side target movement amount determination unit 572. In addition, in a case where the front wheel side solenoid valve 270 is a normally closed solenoid valve, the energization becomes unnecessary when the front wheel side target movement amount is zero. In addition, in a case where the rear wheel side solenoid valve 170 is a normally closed solenoid valve, the energization becomes necessary when the rear wheel side target movement amount is zero.

In addition, when the front wheel side target current is determined based on the front wheel side target movement amount determined by the front wheel side target movement amount determination unit 571, the front wheel side target current determination unit 511 performs feedback control based on deviation between the front wheel side target movement amount determined by the front wheel side target movement amount determination unit 571 and the actual front wheel side movement amount Lf grasped by the front wheel side movement amount grasping unit 53 (refer to FIG. 12), and may determine the front wheel side target current.

Similarly, when the rear wheel side target current is determined based on the rear wheel side target movement amount determined by the rear wheel side target movement amount determination unit 572, the rear wheel side target current determination unit 512 performs feedback control based on deviation between the rear wheel side target movement amount determined by the rear wheel side target movement amount determination unit 572 and the actual rear wheel side movement amount Lr grasped by the rear wheel side movement amount grasping unit 54 (refer to FIG. 12), and may determine the rear wheel side target current.

The controller 520 includes a front wheel side working controller 530 which controls an operation of the front wheel side solenoid valve 270, a front wheel side solenoid valve drive unit 533 which drives the front wheel side solenoid valve 270, and a front wheel side detector 534 which detects the actual current which actually flows to the front wheel side solenoid valve 270. In addition, the controller 520 includes a rear wheel side working controller 540 which controls an operation of the rear wheel side solenoid valve 170, a rear wheel side solenoid valve drive unit 543 which drives the rear wheel side solenoid valve 170, and a rear wheel side detector 544 which detects a actual current which actually flows to the rear wheel side solenoid valve 170.

The front wheel side working controller 530 includes a front wheel side feedback (F/B) controller 531 which performs the feedback control based on the deviation between the front wheel side target current determined by the front wheel side target current determination unit 511 and the actual current (front wheel side actual current) detected by the front wheel side detector 534, and a front wheel side PWM controller 532 which PWM-controls the front wheel side solenoid valve 270.

The rear wheel side working controller 540 includes a rear wheel side feedback (F/B) controller 541 which performs the feedback control based on the deviation between the rear wheel side target current determined by the rear wheel side target current determination unit 512 and the actual current (rear wheel side actual current) detected by the rear wheel side detector 544, and a rear wheel side PWM controller 542 which PWM-controls the rear wheel side solenoid valve 170.

The front wheel side feedback controller 531 acquires the deviation between the front wheel side target current and the front wheel side actual current detected by the front wheel side detector 534, and performs feedback process such that the deviation becomes zero. The rear wheel side feedback controller 541 acquires the deviation between the rear wheel side target current and the rear wheel side actual current detected by the rear wheel side detector 544, and performs feedback process such that the deviation becomes zero. The front wheel side feedback controller 531 can employ an example in which proportional processing is performed by a proportional element with respect to the deviation between the front wheel side target current and the front wheel side actual current, integration processing is performed by an integral element, and the values are added to each other by an addition calculator. Otherwise, as described above, for example, the front wheel side feedback controller 531 can employ an example in which proportional processing is performed by the proportional element with respect to the deviation between the target current and the actual current, integration processing is performed by an integral element, and further, differentiation processing is performed by a differentiation element, and the values are added to each other by the addition calculator. Similarly, the rear wheel side feedback controller 541 can employ an example in which proportional processing is performed by a proportional element with respect to the deviation between the rear wheel side target current and the rear wheel side actual current, integration processing is performed by an integral element, and the values are added to each other by the addition calculator. Otherwise, as described above, for example, the rear wheel side feedback controller 541 can employ an example in which proportional processing is performed by the proportional element with respect to the deviation between the target current and the actual current, integration processing is performed by an integral element, and further, differentiation processing is performed by a differentiation element, and the values are added to each other by the addition calculator.

The front wheel side PWM controller 532 changes a duty ratio ($=t/T \times 100(\%)$) of a pulse width (t) of a certain period (T), and PWM-controls the opening degree (voltage applied to the coil of the front wheel side solenoid valve 270) of the front wheel side solenoid valve 270. When the PWM control is performed, the voltage applied to the coil of the front wheel side solenoid valve 270 is applied in a pulse shape which corresponds to the duty ratio. At this time, the current which flows to the coil 271 of the front wheel side solenoid valve 270 is weakened and output without being changed according to the voltage applied in a pulse shape due to the impedance of the coil 271, and the current which flows to the coil of the front wheel side solenoid valve 270 increases and decreases in proportion to the duty ratio. In addition, the front wheel side PWM controller 532 can employ an example in which the duty ratio is set to be zero in a case where the front wheel side target current is zero and the duty ratio is set to be 100% in a case where the front wheel side target current is the above-described maximum current or a first target current A1 which will be described later.

Similarly, the rear wheel side PWM controller 542 changes the duty ratio and PWM-controls the opening degree (voltage applied to the coil of the rear wheel side solenoid valve 170) of the rear wheel side solenoid valve 170. When the PWM control is performed, the voltage applied to the coil 171 of the rear wheel side solenoid valve 170 is applied in the pulse shape which corresponds to the duty ratio, and the current which flows in the coil 171 of the rear wheel side solenoid valve 170 increases and decreases in proportion to the duty ratio. In addition, the rear wheel side PWM controller 542 can employ an example in which the duty ratio is set to be zero in a case where the rear wheel side target current is zero and the duty ratio is set to be 100% in a case where the rear wheel side target current is the above-described maximum current or a second target current A2 which will be described later.

The front wheel side solenoid valve drive unit 533 includes, for example, a transistor (FET) which is connected to a space between a positive electrode side line of a power source and the coil of the front wheel side solenoid valve 270 and which serves as a switching element. In addition, by driving a gate of the transistor and by switch-operating the transistor, the driving of the front wheel side solenoid valve 270 is controlled. The rear wheel side solenoid valve drive unit 543 includes, for example, a transistor which is connected to a space between the positive electrode side line of the power source and the coil of the rear wheel side solenoid valve 170. In addition, by driving the gate of the transistor and by switch-operating the transistor, the driving of the rear wheel side solenoid valve 170 is controlled.

The front wheel side detector 534 detects a value of the actual current which flows to the front wheel side solenoid valve 270 from the voltage generated at both ends of a shunt resistance connected to the front wheel side solenoid valve drive unit 533. The rear wheel side detector 544 detects a value of the actual current which flows to the rear wheel side solenoid valve 170 from the voltage generated at both ends of the shunt resistance connected to the rear wheel side solenoid valve drive unit 543.

In the motorcycle 1 configured as described above, the solenoid valve controller 57 of the control device 50 determines the target current based on the target movement amount which corresponds to the weight applied to the motorcycle 1, and performs the PWM control such that the actual current supplied to the front wheel side solenoid valve 270 and the rear wheel side solenoid valve 170 becomes the determined target current. In other words, the front wheel side PWM controller 532 of the solenoid valve controller 57 and the rear wheel side PWM controller 542 control the power supplied to the coils 271 and 171 of the front wheel side solenoid valve 270 and the rear wheel side solenoid valve 170 by changing the duty ratio, and control arbitrary opening degrees of the front wheel side solenoid valve 270 and the rear wheel side solenoid valve 170. Accordingly, the control device 50 can change the target movement amount to a target movement amount which corresponds to the weight applied to the motorcycle 1 as illustrated in FIGS. 16A and 16B by controlling the opening degrees of the front wheel side solenoid valve 270 and the rear wheel side solenoid valve 170 and by controlling an upper limit of an amount of liquid (oil) which flows to the jack chamber 242 and the jack chamber 142. In the relationship between the weight applied to the motorcycle 1 and the target movement amount illustrated in FIGS. 16A and 16B, the front wheel side target movement amount Lf0 and the rear wheel side target movement amount Lr0 increase according to the increase in weight. Accordingly, initial loads of the front wheel side suspension spring 210 and the rear wheel side suspension spring 110 increase according to the increase in weight applied to the motorcycle 1. Therefore, the front fork 10 and the rear suspension 22 are unlikely to be compressed in a case where the weight applied to the motorcycle 1 is large, and meanwhile, the front fork 10 and the rear suspension 22 are likely to be compressed in a case where the weight applied to the motorcycle 1 is small. Therefore, it is possible to set the vehicle height to a desirable height regardless of the weight applied to the motorcycle 1. As a result, since it is also possible to set the vehicle height to a desirable height while traveling in a case where two persons get on the vehicle, in a case where the baggage is heavy, or regardless of physique of the driver, it is possible to improve a ride quality or traveling stability. In addition, the front wheel side PWM controller 532 of the solenoid valve controller 57 and the rear wheel side PWM controller 542 may control the detected movement amount to match the target movement amount. In this case, the front wheel side PWM controller 532 and the rear wheel side PWM controller 542 determine the target current based on the target movement amount and the detected movement amount.

Figure 17A:
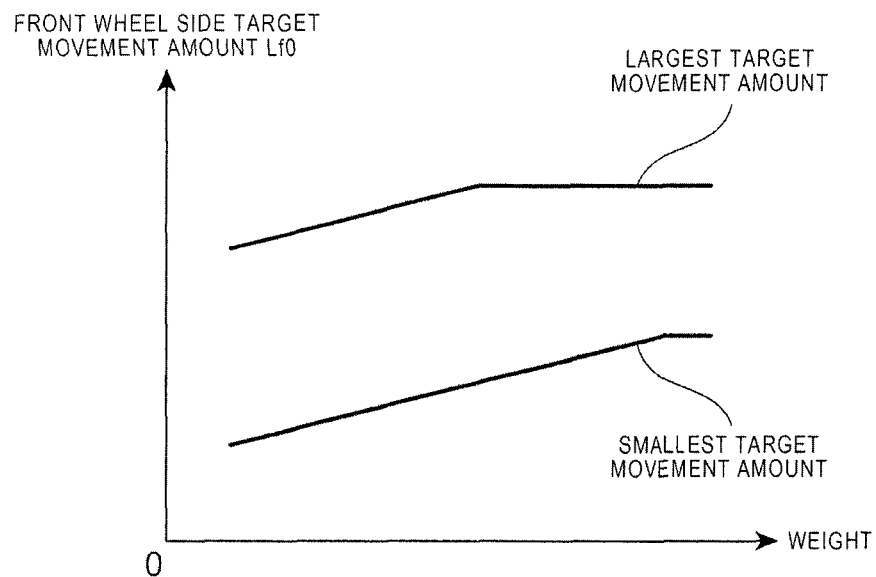
FIG. 17A is a view illustrating a relationship between the weight applied to the motorcycle and the front wheel side target movement amount.
Figure 17B:
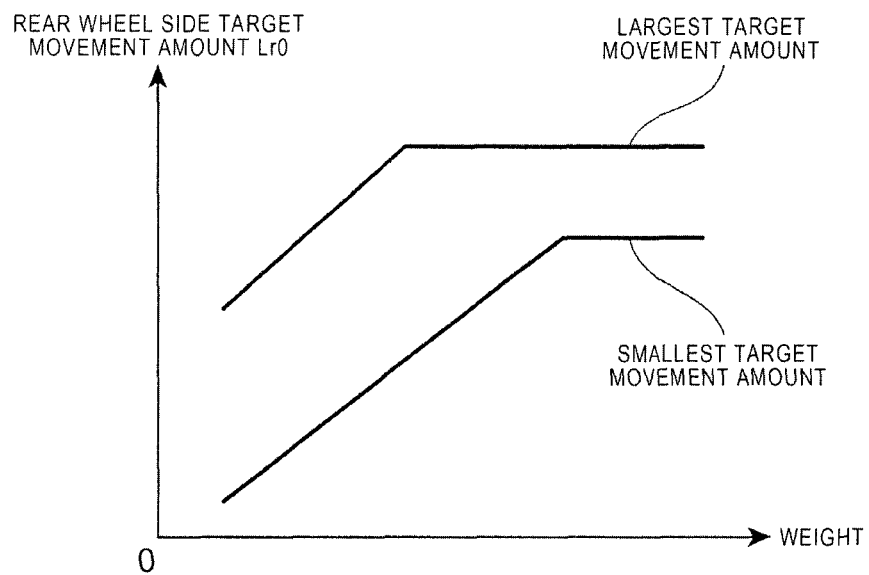
FIG. 17B is a view illustrating a relationship between the weight applied to the motorcycle and the rear wheel side target movement amount.

FIG. 17A is a view illustrating a relationship between the weight applied to the motorcycle 1 and the front wheel side target movement amount Lf0. FIG. 17B is a view illustrating a relationship between the weight applied to the motorcycle 1 and the rear wheel side target movement amount Lr0.

In FIG. 17A, the largest target movement amount and the smallest target movement amount of the front wheel side target movement amount Lf0 are described, and in FIG. 17B, the largest target movement amount and the smallest target movement amount of the rear wheel side target movement amount Lr0 are described. The largest target movement amount of the front wheel side target movement amount LfD illustrated in FIG. 17A is a movement amount which corresponds to the front wheel side target movement amount LfD described in FIG. 16A. The largest target movement amount of the rear wheel side target movement amount Lr0 illustrated in FIG. 17B is a movement amount which corresponds to the rear wheel side target movement amount Lr0 described in FIG. 16B.

In addition, the target movement amount determination unit 570 considers the target amount in a case where the vehicle speed Vc after the start of traveling is lower than the raising speed Vu, or in a case where the vehicle speed Vc becomes equal to or lower than the lowering speed Vd from the state of traveling at a speed which is equal to or higher than the raising speed Vu, to be the smallest target movement amount which corresponds to the weight applied to the motorcycle 1 as illustrated in FIGS. 17A and 17B. In other words, the control device 50 changes the smallest target movement amount to be the target movement amount which corresponds to the weight applied to the motorcycle 1 as illustrated in FIGS. 17A and 17B by controlling the opening degree of the front wheel side solenoid valve 270, by controlling a lower limit of the amount of liquid (oil) which flows into the jack chamber 242, by controlling the opening degree of the rear wheel side solenoid valve 170, and by controlling a lower limit of liquid (oil) which flows into the jack chamber 142. Accordingly, according to the control device 50, it is possible to set the vehicle height when traveling at a low speed to a desirable height regardless of the weight applied to the motorcycle 1. As a result, since it is also possible to set the vehicle height when traveling at a low speed to be a desirable height in a case where two persons get on the vehicle, in a case where the baggage is heavy, or regardless of physique of the driver, it is possible to improve a ride quality or traveling stability.

Next, correction of the control of the solenoid valve controller 57 based on the detection result of the front wheel side length change amount detector 342 and the rear wheel side length change amount detector 341 will be described.

As described above, the control device 50 according to the embodiment controls the front wheel side relative position changing device 240, changes the spring length of the front wheel side suspension spring 210, and changes the spring force of the front wheel side suspension spring 210. In addition, the control device 50 controls the rear wheel side relative position changing device 140, changes the spring length of the rear wheel side suspension spring 110, and changes the spring force of the rear wheel side suspension spring 110. In addition, the control device 50 controls the front wheel side relative position changing device 240 and the rear wheel side relative position changing device 140 such that the support members 241 and 141 of the front wheel side relative position changing device 240 and the rear wheel side relative position changing device 140 move only by the target movement amount specified based on the weight input by the input device 34, changes the spring force of the front wheel side suspension spring 210 and the rear wheel side suspension spring 110, and thus, controls the vehicle height to be a desirable height regardless of the weight applied to the motorcycle 1. Here, when the desirable height of the vehicle height is set to be a target height by the control of the control device 50, as the control device 50 moves the support members 241 and 141 by the target movement amount, the vehicle height becomes the target height.

However, due to various reasons, there is a case where the calculated vehicle height reached by moving the support members 241 and 141 of the front wheel side relative position changing device 240 and the rear wheel side relative position changing device 140 by the control of the control device 50 does not match the actual vehicle height. Specifically, in a case where the vehicle height does not reach the target height even when the movement amounts of the support members 241 and 141 reach the target movement amount, there is a case where the vehicle height reaches the target height even though the movement amounts of the support members 241 and 141 do not reach the target movement amount. Such a state can be generated, for example, in a case where the weight input by the input device 34 and the actual weight applied to the motorcycle 1 do not match each other, or in a case where there is a trouble in the detector, such as the rear wheel side relative position detector 195 and the front wheel side relative position detector 295 and a value is misdetected. The vehicle height adjustment apparatus according to the embodiment corrects the vehicle height adjustment by the front wheel side relative position changing device 240 and the rear wheel side relative position changing device 140 based on the information related to the actual vehicle height in order to respond to the situation. In the embodiment, as the information related to the actual vehicle height, the detection result of the rear wheel side length change amount detector 341 and the front wheel side length change amount detector 342 is used. In other words, in the embodiment, the rear wheel side length change amount detector 341 and the front wheel side length change amount detector 342 function as the information obtaining device which obtains the information related to the vehicle height. Hereinafter, as an example of a vehicle height-related target value, a change amount detected by the rear wheel side length change amount detector 341 when the vehicle height becomes the target height is considered as a target length change amount on the rear wheel side, a change amount detected by the front wheel side length change amount detector 342 when the vehicle height becomes the target height is considered as a target length change amount on the front wheel side, and the target length change amounts are used in comparing the target movement amounts of the support members 241 and 141 instead of the target height.

FIG. 18 is a view illustrating a change in a movement amount Lf on a front wheel side and a change in a length change amount Ff on the front wheel side following traveling of the motorcycle 1 in a case where the vehicle height does not reach the target height even when the movement amount of the support member 241 reaches the target movement amount.

As illustrated in FIG. 15, when the motorcycle 1 according to the embodiment travels at a vehicle speed which is equal to or higher than the raising speed Vu, the front wheel side relative position changing device 240 operates in accordance with expanding and contracting vibration of the front fork 10, and moves the support member 241. In addition, as the support member 241 moves, the spring force of the front wheel side suspension spring 210 changes, and according to this, the vehicle height of the motorcycle 1 changes. In the example illustrated in FIG. 18, the motorcycle 1 travels at a vehicle speed which is equal to or higher than the raising speed Vu, the movement amount Lf of the support member 241 on the front wheel side changes to be close to the front wheel side target movement amount Lf0 in accordance with the lapse of time, and according to this, the length change amount Ff on the front wheel side also changes to be close to a target length change amount Ff0 which is a length change amount that corresponds to the target height of the motorcycle 1. In addition, actually, since the change speeds of the movement amount Lf and the length change amount Ff vary in accordance with a state of a road surface or the like, changes in the movement amount Lf and the length change amount Ff which correspond to the lapse of time are not uniform. However, in FIG. 18, for making it simple, changes in the movement amount Lf and the length change amount Ff are illustrated by smooth lines.

In the example illustrated in FIG. 18, the movement amount Lf of the support member 241 on the front wheel side reaches the front wheel side target movement amount Lf0 at a time t1. However, at the time t1, a length change amount Fft1 on the front wheel side does not reach the target length change amount Ff0. In other words, the vehicle height of the motorcycle 1 does not reach the target height. In the embodiment, in this case, the front wheel side target movement amount Lf0 of the support member 241 is corrected based on deviation between the length change amount Fft1 on the front wheel side and the target length change amount Ff0, and insufficient movement amount Lf of the support member 241 is replenished. Specifically, for example, the front wheel side feedback controller 531 of the front wheel side working controller 530 of the controller 520 (refer to FIG. 13) obtains the length change amount Fft1 from the front wheel side length change amount detector 342, adds the deviation between the length change amount Fft1 and the target length change amount Ff0 set in advance to integration processing as an integral element, and performs the feedback process in the control of the front wheel side solenoid valve 270. Accordingly, the movement of the support member 241 on the front wheel side is further performed until the length change amount Ff reaches the target length change amount Ff0. In the example illustrated in FIG. 18, a length change amount Fft2 at a time t2 reaches the target length change amount Ff0. Therefore, the movement amount Lft2 of the support member 241 at the time t2 becomes the corrected front wheel side target movement amount Lf0.

Figure 19:
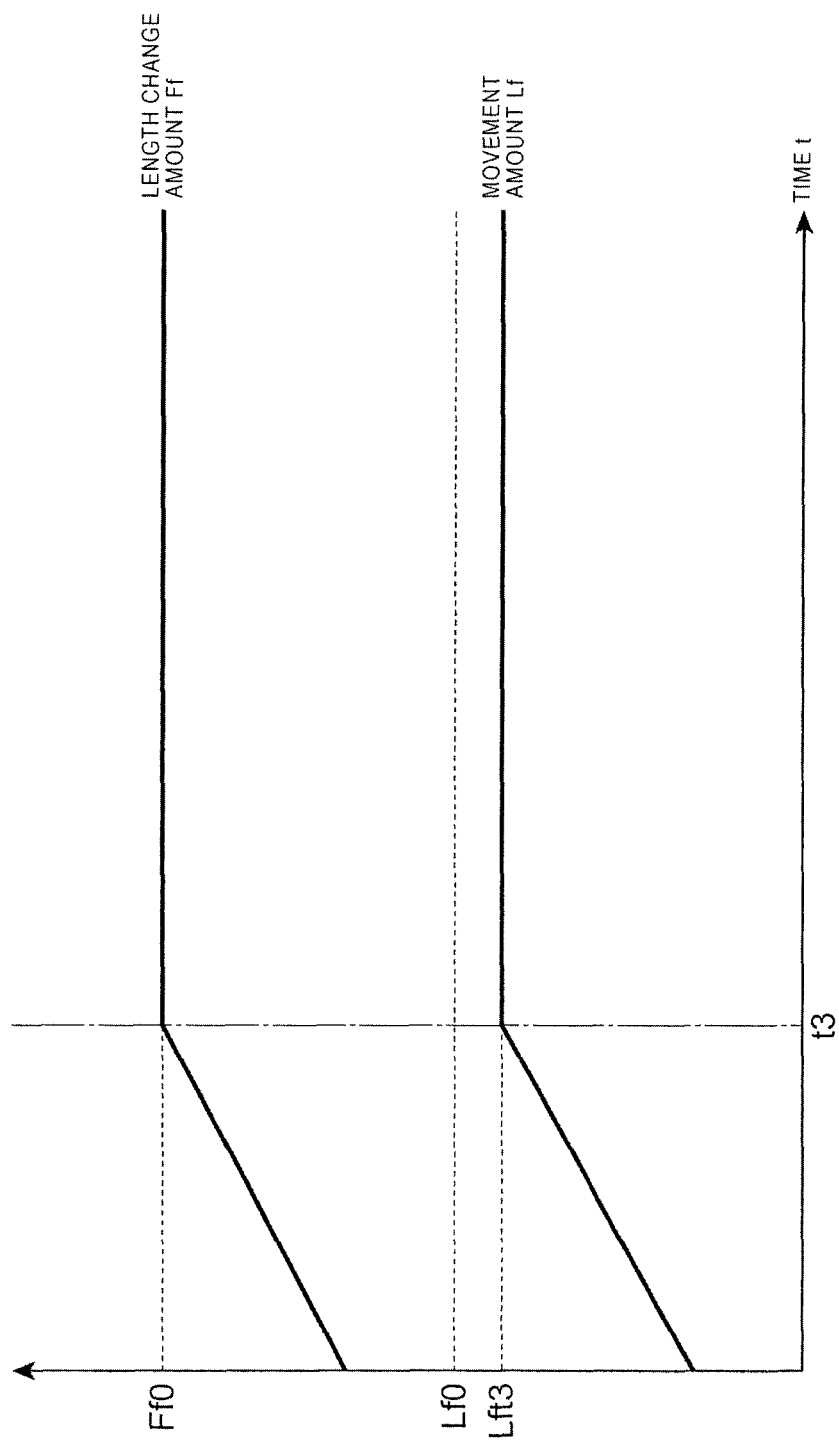
FIG. 19 is a view illustrating a change in a movement amount on the front wheel side and a change in a length change amount on the front wheel side following the traveling of the motorcycle in a case where the vehicle height reaches the target height even when the movement amount of the support member does not reach the target movement amount.

FIG. 19 is a view illustrating a change in the movement amount Lf on the front wheel side and a change in the length change amount Ff on the front wheel side following the traveling of the motorcycle 1 in a case where the vehicle height reaches the target height even when the movement amount of the support member 241 does not reach the target movement amount.

In the example illustrated in FIG. 19, the motorcycle 1 travels at a vehicle speed which is equal to or higher than the raising speed Vu, the movement amount Lf of the support member 241 on the front wheel side changes to be close to the front wheel side target movement amount Lf0 in accordance with the lapse of time, and according to this, the length change amount Ff on the front wheel side also changes to be close to the target length change amount Ff0 which is the length change amount that corresponds to the target height of the motorcycle 1. In addition, at a time t3, a length change amount Fft3 on the front wheel side reaches the target length change amount Ff0. However, at the time t3, a movement amount Lft3 of the support member 241 on the front wheel side does not reach the front wheel side target movement amount Lf0. In other words, the vehicle height of the motorcycle 1 reaches the target height through the movement amount Lft3 of the support member 241 does not reach the front wheel side target movement amount Lf0.

Here, in the embodiment, the control of the support members 241 and 141 by the front wheel side relative position changing device 240 and the rear wheel side relative position changing device 140 is performed to adjust the vehicle height of the motorcycle 1. Therefore, as described above, when the length change amount Ff on the front wheel side reaches the target length change amount Ff0 that corresponds to the target height, it is not necessary to further move the support member 241 on the front wheel side. Therefore, as illustrated in FIG. 19, the movement amount Lft3 of the support member 241 at the time t3 becomes the corrected front wheel side target movement amount Lf0.

The correction control of the front wheel side target movement amount Lf0 of the support member 241 based on the detection result of the front wheel side length change amount detector 342 according to the embodiment described above is performed considering whether the movement amount Lf of the support member 241 reaches the front wheel side target movement amount Lf0 or the length change amount Ff detected by the front wheel side length change amount detector 342 reaches the target length change amount Ff0, as a start condition. In addition, as described above, the correction control is continuously performed as long as a state where the length change amount Ff detected by the front wheel side length change amount detector 342 does not match the target length change amount Ff0 even when the movement amount Lf of the support member 241 and the front wheel side target movement amount Lf0 match each other, or a state where the movement amount Lf does not match the front wheel side target movement amount Lf0 even when the length change amount Ff and the target length change amount Ff0 match each other, is generated. In addition, execution of the correction control may be finished if the movement amount Lf and the front wheel side target movement amount Lf0 match each other and the length change amount Ff and the target length change amount Ff0 match each other, or if a certain period of time has elapsed after the movement amount Lf and the front wheel side target movement amount Lf0 match each other and the length change amount Ff and the target length change amount Ff0 match each other.

Above, the correction of the front wheel side target movement amount Lf0 of the support member 241 on the front wheel side is described, but the correction of the rear wheel side target movement amount Lr0 of the support member 141 on the rear wheel side can also be performed in a completely similar manner. In other words, in a case where the length change amount on the rear wheel side does not reach the target length change amount (in a case where the vehicle height does not reach the target height) even when the movement amount of the support member 141 reaches the rear wheel side target movement amount Lr0, the deviation between the detection value of the length change amount obtained from the rear wheel side length change amount detector 341 and the target length change amount set in advance is added to the integration processing as an integral element, and the feedback process is performed in the control of the rear wheel side solenoid valve 170. Accordingly, the rear wheel side target movement amount Lr0 of the support member 141 is corrected, and the movement of the support member 241 on the front wheel side is further performed.

Meanwhile, in a case where the length change amount on the rear wheel side reaches the target length change amount (in a case where the vehicle height reaches the target height) even when the movement amount of the support member 141 does not reach the rear wheel side target movement amount Lr0, the movement amount of the support member 141 at the time when the length change amount reaches the target length change amount becomes the corrected rear wheel side target movement amount Lr0.

A start condition and a finish condition of the correction control can be set similar to the correction control based on the detection result of the above-described front wheel side length change amount detector 342.

Modification Example 1

In the above-described embodiment, a configuration in which the front wheel side length change amount detector 342 and the rear wheel side length change amount detector 341 are respectively provided is employed. In addition, by using the change amount of the entire length (or the spring length of the front wheel side suspension spring 210) of the front fork 10 detected by the front wheel side length change amount detector 342, the correction of the target movement amount of the support member 241 of the front wheel side relative position changing device 240 is performed. In addition, by using the change amount of the entire length (or the spring length of the rear wheel side suspension spring 110) of the rear suspension 22 detected by the rear wheel side length change amount detector 341, the correction of the target movement amount of the support member 141 of the rear wheel side relative position changing device 140 is performed. Meanwhile, a configuration in which only one of the front wheel side length change amount detector 342 and the rear wheel side length change amount detector 341 is provided and the other length change amount is estimated based on the detection result of one length change amount may be employed.

As an example, a configuration in which only the rear wheel side length change amount detector 341 is provided and the change amount of the length (or the spring length of the front wheel side suspension spring 210) of the front fork 10 is estimated based on the change amount of the length (or the spring length of the rear wheel side suspension spring 110) of the rear suspension 22 is considered. In general, in the motorcycle 1, as illustrated in FIG. 1, the seat 19 on which the driver sits is positioned substantially immediately above the rear wheel 21. Therefore, it is considered that the rear suspension 22 (rear wheel side suspension apparatus) is likely to be influenced by the weight applied to the motorcycle 1.

In the example, by using the change amount of the entire length (or the spring length of the rear wheel side suspension spring 110) of the rear suspension 22 detected by the rear wheel side length change amount detector 341 similar to the above-described embodiment based on the detection value of the rear wheel side length change amount detector 341, the correction of the target movement amount of the support member 141 of the rear wheel side relative position changing device 140 is performed. In addition, previously, based on the correction amount of the target movement amount on the front wheel side that is correlated with the correction amount of the target movement amount on the rear wheel side, the correction of the target movement amount of the support member 241 of the front wheel side relative position changing device 240 is performed. The correction amount of the target movement amount on the front wheel side which corresponds to the correction amount of the target movement amount on the rear wheel side may be obtained by performing calculation by a calculation formula set in advance, and the correction amount may be obtained with reference a table by preparing the table created based on correspondence in advance.

Modification Example 2

In the above-described embodiment, as the information related to the vehicle height, the detection result of the rear wheel side length change amount detector 341 and the front wheel side length change amount detector 342 is used, but the invention is not particularly limited to the configuration. Various pieces of information based on the measurement different from the movement amounts of the support members 241 and 141 of the front wheel side relative position changing device 240 and the rear wheel side relative position changing device 140 may be used as the information related to the vehicle height. For example, the distance between a specific part of the motorcycle 1 and a ground surface may be directly estimated by using a distance measurement sensor, and the obtained measured value may be used as information related to the vehicle height.

Modification Example 3

In addition, in the above-described embodiment, after the motorcycle 1 starts to travel, in a case where the vehicle speed Vc grasped by the vehicle speed grasping unit 56 is lower than the raising speed Vu, and in a case where the vehicle speed Vc becomes equal to or lower than the lowering speed Vd from a state of traveling at a speed which is equal to or higher than the raising speed Vu, the target movement amount determination unit 570 determines the target movement amount to be zero, but the invention is not particularly limited thereto. For example, the smallest target movement amount is not set to be zero, and the smallest target movement amount may be determined in accordance with the weight applied to the motorcycle 1.

Modification Example 4

In the above-described embodiment, as the input device 34, a so-called dial type device is used, but the invention is not particularly limited thereto. When the user can select the weight applied to the motorcycle 1, the input device 34 may be, for example, a lever type device which directly moves the handle, a switch type device which presses a button of the weight, and a touch panel which inputs the weight by pressing a display on the screen.

Modification Example 5

In the above-described embodiment, the weight grasping unit 575 grasps the weight applied to the motorcycle 1 based on the weight input to the input device 34 provided in the motorcycle 1, but the invention is not particularly limited thereto.

For example, a weight sensor may be provided on the inside of the seat 19 of the motorcycle 1, and the weight grasping unit 575 may grasp the weight applied to the motorcycle 1 based on the weight detected by the weight sensor. An example in which the weight grasping unit 575 grasps the weight applied to the motorcycle 1 based on the detection value of the weight sensor in a case where the vehicle speed Vc is lower than the raising speed Vu before the vehicle height starts to increase, can be employed.

In addition, the weight grasping unit 575, for example, may grasp the weight applied to the motorcycle 1 based on the change speed of the movement amount based on the front wheel side movement amount Lf and the rear wheel side movement amount Lr after a predetermined time has elapsed after the vehicle height starts to increase after a state where the vehicle height is not high.

Modification Example 6

In a case where the power is not supplied to the control device 50, for example, in a case where the engine 17 of the motorcycle 1 is stopped, the weight grasping unit 575 accommodates the weight applied to the motorcycle 1 grasped during the initiation to the EEPROM or the like, and the accommodated weight may be read during the next initiation.

Modification Example 7

With respect to the correlation between the weight applied to the motorcycle 1 and the target movement amount that are stored in the ROM as illustrated in FIGS. 16A, 16B, 17A, and 17B, after the front fork 10 and the rear suspension 22 are mounted on the motorcycle 1, offset correction may be performed according to the motorcycle 1. Accordingly, it is possible to correct unevenness of each of the front fork 10 and the rear suspension 22.

Modification Example 8

Figure 20A:
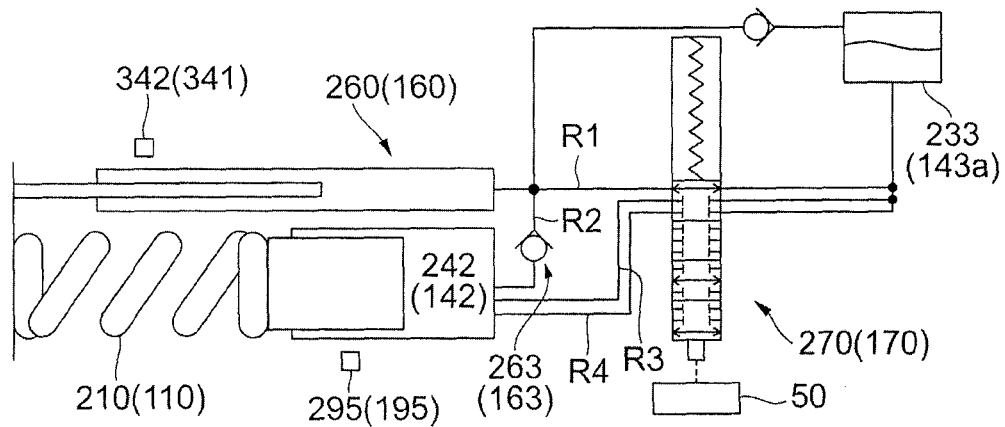
FIGS. 20A, 20B, 20C, and 20D are schematic views of a vehicle height adjustment apparatus according to a modification example 8.
Figure 20B:
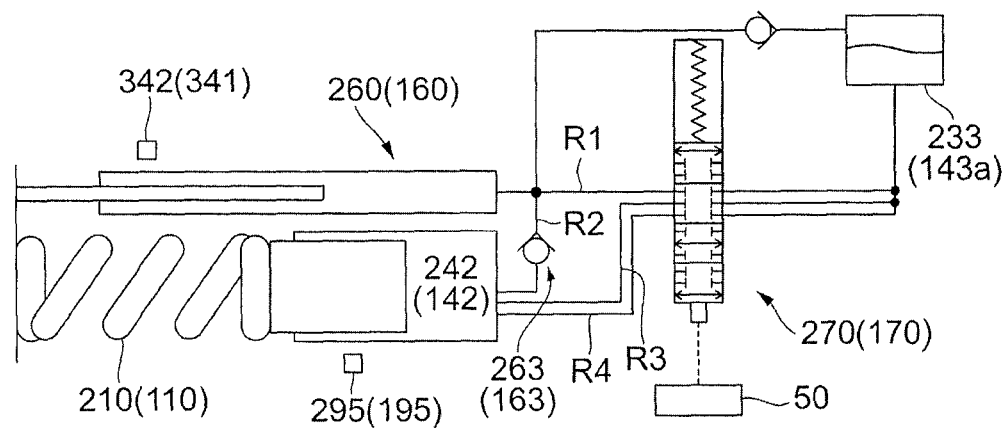
Figure 20C:
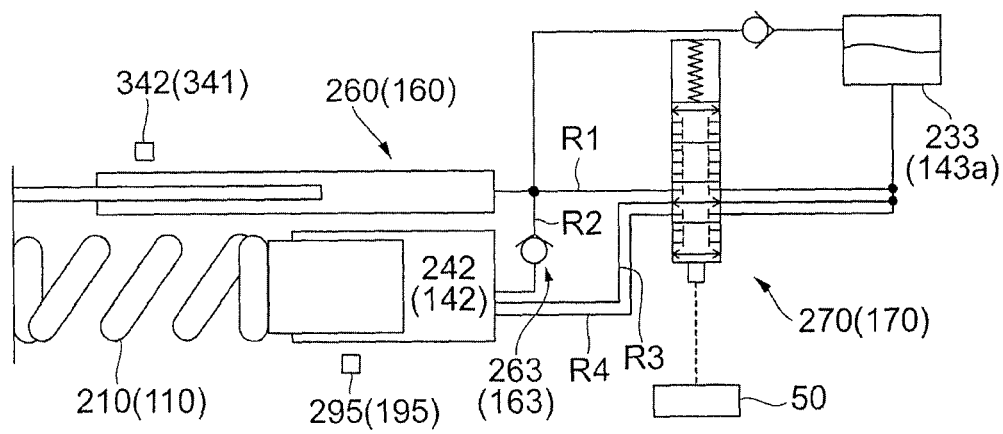
Figure 20D:
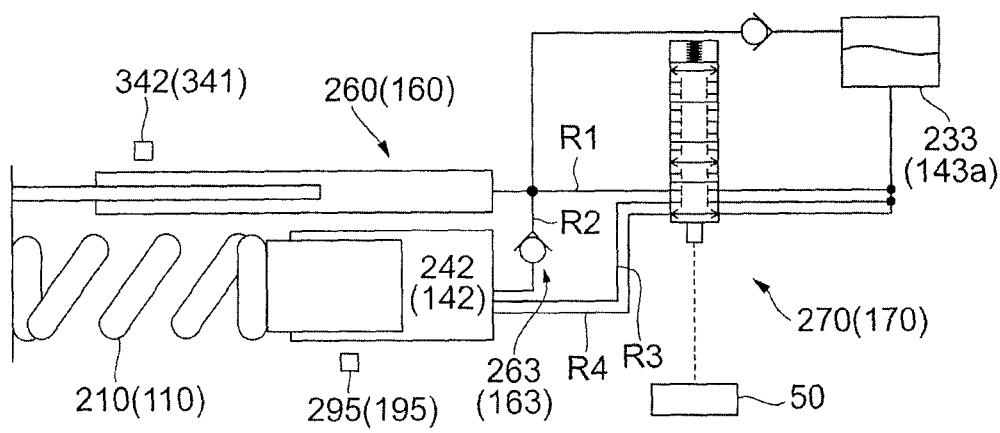

As illustrated in FIGS. 20A, 20B, 20C, and 20D, a configuration in which flow paths R1, R2, R3, and R4 through which working oil flows are switched in accordance with a switch state (for example, the opening degree or the working amount of the solenoid valve) of a flow path switching unit including the front wheel side solenoid valve 270 (rear wheel side solenoid valve 170) may be employed. FIG. 20A is a schematic view describing a state where the vehicle height is maintained, FIG. 20B is a schematic view describing a state where the vehicle height is raised, FIG. 20C is a schematic view describing a state where the vehicle height is lowered, and FIG. 20D is a view describing a state where the vehicle height is rapidly lowered.

What is claimed is:
1. A vehicle height adjustment apparatus comprising:
a spring which connects a vehicle main body of a vehicle and a wheel to each other and expands and contracts in accordance with a weight applied to the vehicle;
a damper which damps vibration of the spring by movement of working oil that follows an expansion and contraction operation;
a support member which supports one end portion of the spring and moves with respect to the damper to thereby change a length of the spring;
a working oil chamber into which the working oil, which moves the support member with respect to the damper, flows in accordance with the expansion and contraction operation of the damper;
a solenoid valve which adjusts an amount of working oil that flows into the working oil chamber by an opening degree thereof;
an information obtaining device which obtains information related to a vehicle height; and
a control device, wherein
the control device controls the opening degree of the solenoid valve to allow a movement amount of the support member to reach a movement amount target value that corresponds to the vehicle height set in advance, in accordance with the weight applied to the vehicle, and the control device controls the opening degree of the solenoid valve to change the movement amount of the support member based on a difference between (i) a value based on the information related to the vehicle height and (ii) a vehicle height-related target value, on condition that the movement amount of the support member reaches the movement amount target value and the value based on the information related to the vehicle height obtained by the information obtaining device does not reach the vehicle height-related target value that corresponds to the vehicle height set in advance.

2. The vehicle height adjustment apparatus according to claim 1, wherein the control device further controls the opening degree of the solenoid valve by changing the movement amount target value to a value that corresponds to the vehicle height-related target value, on condition that the value based on the information related to the vehicle height obtained by the information obtaining device reaches the vehicle height-related target value and the movement amount of the support member does not reach the movement amount target value.

3. The vehicle height adjustment apparatus according to claim 1, wherein the information obtaining device obtains information related to the vehicle height based on an expansion and contraction amount of the spring.

4. The vehicle height adjustment apparatus according to claim 2, wherein the information obtaining device obtains information related to the vehicle height based on an expansion and contraction amount of the spring.

5. The vehicle height adjustment apparatus according to claim 1, wherein the solenoid valve comprises a first solenoid valve provided on a front wheel side of the vehicle and a second solenoid valve provided on a rear wheel side of the vehicle, the control device controls the opening degree of one solenoid valve among the first and second solenoid valves to change the movement amount of the support member based on the difference between (i) the value based on the information related to the vehicle height obtained by the information obtaining device and (ii) the vehicle height-related target value, and the control device controls the opening degree of the other solenoid valve among the first and second solenoid valves to change the movement amount of the support member based on the control of the opening degree of the one solenoid valve.

6. The vehicle height adjustment apparatus according to claim 2, wherein the solenoid valve comprises a first solenoid valve provided on a front wheel side of the vehicle and a second solenoid valve provided on a rear wheel side of the vehicle, the control device controls the opening degree of one solenoid valve among the first and second solenoid valves to change the movement amount of the support member based on the difference between (i) the value based on the information related to the vehicle height obtained by the information obtaining device and (ii) the vehicle height-related target value, and the control device controls the opening degree of the other solenoid valve among the first and second solenoid valves to change the movement amount of the support member based on the control of the opening degree of the one solenoid valve.

7. The vehicle height adjustment apparatus according to claim 3, wherein the solenoid valve comprises a first solenoid valve provided on a front wheel side of the vehicle and a second solenoid valve provided on a rear wheel side of the vehicle, the control device controls the opening degree of one solenoid valve among the first and second solenoid valves to change the movement amount of the support member based on the difference between (i) the value based on the information related to the vehicle height obtained by the information obtaining device and (ii) the vehicle height-related target value, and the control device controls the opening degree of the other solenoid valve among the first and second solenoid valves to change the movement amount of the support member based on the control of the opening degree of the one solenoid valve.

8. The vehicle height adjustment apparatus according to claim 4, wherein the solenoid valve comprises a first solenoid valve provided on a front wheel side of the vehicle and a second solenoid valve provided on a rear wheel side of the vehicle, the control device controls the opening degree of one solenoid valve among the first and second solenoid valves to change the movement amount of the support member based on the difference between (i) the value based on the information related to the vehicle height obtained by the information obtaining device and (ii) the vehicle height-related target value, and the control device controls the opening degree of the other solenoid valve among the first and second solenoid valves to change the movement amount of the support member based on the control of the opening degree of the one solenoid valve.

* * * * *